US012183229B2

(12) United States Patent
Lee et al.

(10) Patent No.: US 12,183,229 B2
(45) Date of Patent: Dec. 31, 2024

(54) DISPLAY DEVICE

(71) Applicant: Samsung Display Co., LTD., Yongin-si (KR)

(72) Inventors: Jaewoo Lee, Yongin-si (KR); Tae-Ho Kim, Yongin-si (KR); Seung-Jun Lee, Yongin-si (KR); Yongsu Lee, Yongin-si (KR); Seung-Hwan Cho, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/239,919

(22) Filed: Aug. 30, 2023

(65) Prior Publication Data

US 2024/0169870 A1 May 23, 2024

(30) Foreign Application Priority Data

Nov. 22, 2022 (KR) ........................ 10-2022-0157430

(51) Int. Cl.
*G09G 3/00* (2006.01)
*G09G 3/32* (2016.01)

(52) U.S. Cl.
CPC ............. *G09G 3/006* (2013.01); *G09G 3/035* (2020.08); *G09G 3/32* (2013.01); *G09G 2300/0426* (2013.01); *G09G 2310/0297* (2013.01)

(58) Field of Classification Search
CPC ............................................. G09G 2310/0297
See application file for complete search history.

(56) References Cited

U.S. PATENT DOCUMENTS

| | | | | |
|---|---|---|---|---|
| 7,205,972 | B1 * | 4/2007 | Kyeong | G09G 3/3688 345/98 |
| 8,975,761 | B2 | 3/2015 | Jung | |
| 9,685,116 | B2 | 6/2017 | Lee et al. | |
| 11,092,639 | B2 * | 8/2021 | Cheon | H10K 59/131 |
| 11,107,416 | B2 * | 8/2021 | Cho | G09G 3/3275 |
| 11,195,456 | B2 * | 12/2021 | Lee | G09G 3/3225 |
| 11,328,676 | B2 * | 5/2022 | Hyeon | H10K 77/111 |
| 11,783,793 | B1 * | 10/2023 | Lin | G09G 3/36 345/214 |
| 11,908,399 | B2 * | 2/2024 | Choi | G09G 3/3208 |
| 2019/0140036 | A1 * | 5/2019 | Hyeon | H10K 77/111 |
| 2020/0363466 | A1 * | 11/2020 | Cheon | H10K 59/131 |
| 2022/0199750 | A1 | 6/2022 | Cho et al. | |
| 2022/0208124 | A1 | 6/2022 | Choi et al. | |

FOREIGN PATENT DOCUMENTS

| | | |
|---|---|---|
| KR | 1020140053626 A | 5/2014 |
| KR | 1020220092134 A | 7/2022 |

* cited by examiner

*Primary Examiner* — Patrick F Marinelli
(74) *Attorney, Agent, or Firm* — CANTOR COLBURN LLP

(57) ABSTRACT

A display device according to the invention includes: a display panel and a driving chip mounted on the display panel. The display panel includes: a base layer, pixels, signal lines, fan-out lines, and a selection circuit. The base layer includes a first region, a second region bent with respect to a bending axis, and a third region adjacent to the second region. The pixels are arranged in the first region, and the signal lines are arranged in the first region and connected to the pixels. The fan-out lines are arranged in the second region and connected to the signal lines. The selection circuit is arranged between the fan-out lines and the driving chip in the third region and connected to the fan-out lines and the driving chip.

24 Claims, 19 Drawing Sheets

DISPLAY DEVICE

This application claims priority to Korean Patent Application No. 10-2022-0157430, filed on Nov. 22, 2022, and all the benefits accruing therefrom under 35 U.S.C. § 119, the content of which in its entirety is herein incorporated by reference.

BACKGROUND

The present disclosure herein relates to a display device, and more particularly, to a display device with improved image quality.

A multimedia electronic device such as a television, a mobile phone, a tablet PC, a computer, a navigation device, a game machine, and the like is provided with a display panel for displaying an image.

Researches have been carried out to reduce a region in which images are not displayed in a display panel according to market requirements. At the same time, researches are carried out to increase a display region that displays images to a user and reduce a bezel.

SUMMARY

The present disclosure provides a display device capable of preventing deterioration of image quality due to coupling while reducing a bezel.

A display device according to an aspect of the invention includes a display panel and a driving chip mounted on the display panel. The display panel includes a base layer, pixels, signal lines, a plurality of fan-out lines, and a selection circuit.

The base layer includes a first region, a second region adjacent to the first region and bent with respect to a bending axis, and a third region adjacent to the second region. The plurality of pixels are arranged in the first region, and the plurality of signal lines are arranged in the first region and connected to the plurality of pixels. The plurality of fan-out lines are arranged in the second region and connected to the plurality of signal lines. The selection circuit is arranged between the plurality of fan-out lines and the driving chip in the third region and connected to the plurality of fan-out lines and the driving chip.

The selection circuit is electrically connected to first fan-out lines among the plurality of fan-out lines in a first period and electrically connected to second fan-out lines among the plurality of fan-out lines in a second period. Two adjacent first fan-out lines are spaced apart by a first distance in a direction of the bending axis in the second region, and two adjacent second fan-out lines are spaced apart by a second distance in the direction of the bending axis in the second region. A third distance between adjacent first fan-out line and second fan-out line in the direction of the bending axis in the second region is larger than each of the first and second distances.

A display device according to an aspect of the invention includes: a display panel and a driving chip mounted on the display panel. The display panel includes a base layer, pixels, signal lines, a plurality of fan-out lines, and a selection circuit.

The base layer includes a first region, a second region adjacent to the first region and bent with respect to a bending axis, and a third region adjacent to the second region. The pixels are arranged in the first region, and the signal lines are arranged in the first region and connected to the plurality of pixels. The fan-out lines are arranged in the second region and connected to the plurality of signal lines. The selection circuit is arranged between the plurality of fan-out lines and the driving chip in the third region and connected to the plurality of fan-out lines and the driving chip.

The selection circuit includes a first demux unit connected to a 1-1st fan-out line and 2-1st fan-out line among the plurality of fan-out lines and a second demux unit connected to a 1-2nd fan-out line and 2-2nd fan-out line among the plurality of fan-out lines. The 2-1st fan-out line and the 1-2nd fan-out line intersect each other in the third region in a plan view.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
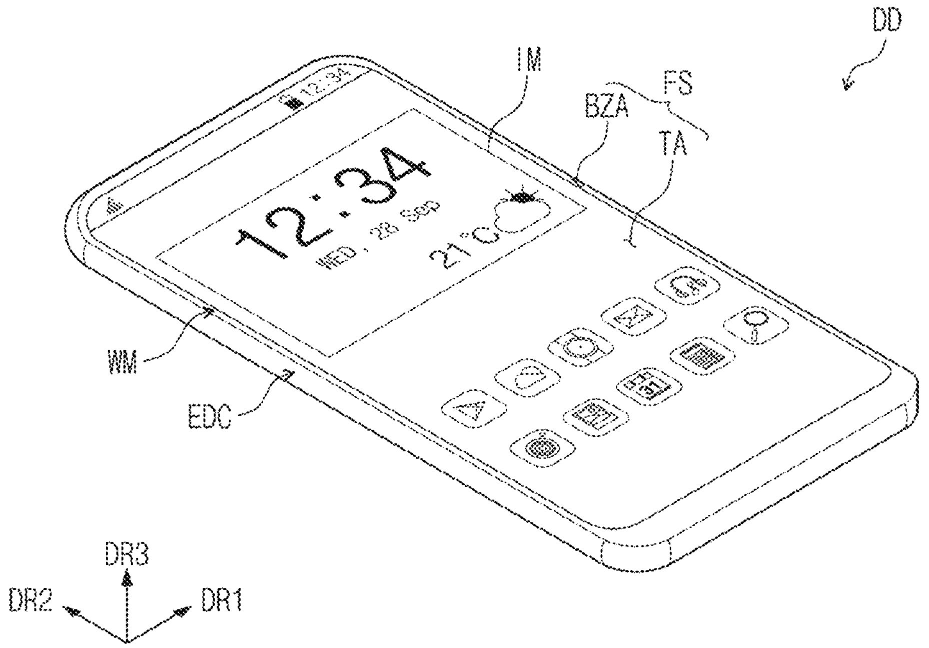
FIG. 1A is a perspective view of a display device according to an embodiment of the invention.

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. In the drawings, the thicknesses, ratios, and dimensions of elements are exaggerated for clarity of illustration. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any combinations that can be defined by associated elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms "first", "second" and the like may be used for describing various elements, but the elements should not be construed as being limited by the terms. Such terms are only used for distinguishing one element from other elements. For example, a first element could be termed a second element and vice versa without departing from the scope of the right of the present invention. The terms of a singular form may include plural forms unless otherwise specified.

Furthermore, the terms "under", "lower side", "on", "upper side", and like are used to describe association relationships among elements illustrated in the drawings. The terms, which are relative concepts, are used on the basis of directions illustrated in the drawings.

It will be further understood that the terms "include", "including", "has", "having", and the like, when used in this specification, specify the presence of stated features, numbers, steps, operations, elements, components, or combinations thereof, but do not preclude the presence or addition of one or more other features, numbers, steps, operations, elements, components, or combinations thereof.

All of the terms used herein (including technical and scientific terms) have the same meanings as understood by those skilled in the art, unless otherwise defined. Terms in common usage such as those defined in commonly used dictionaries should be interpreted to contextually match the lexical meanings in the relevant art, and should not be interpreted in an idealized or overly formal sense unless otherwise defined explicitly.

Hereinafter, embodiments of the invention will be described in detail with reference to the accompanying drawings.

Figure 1B:
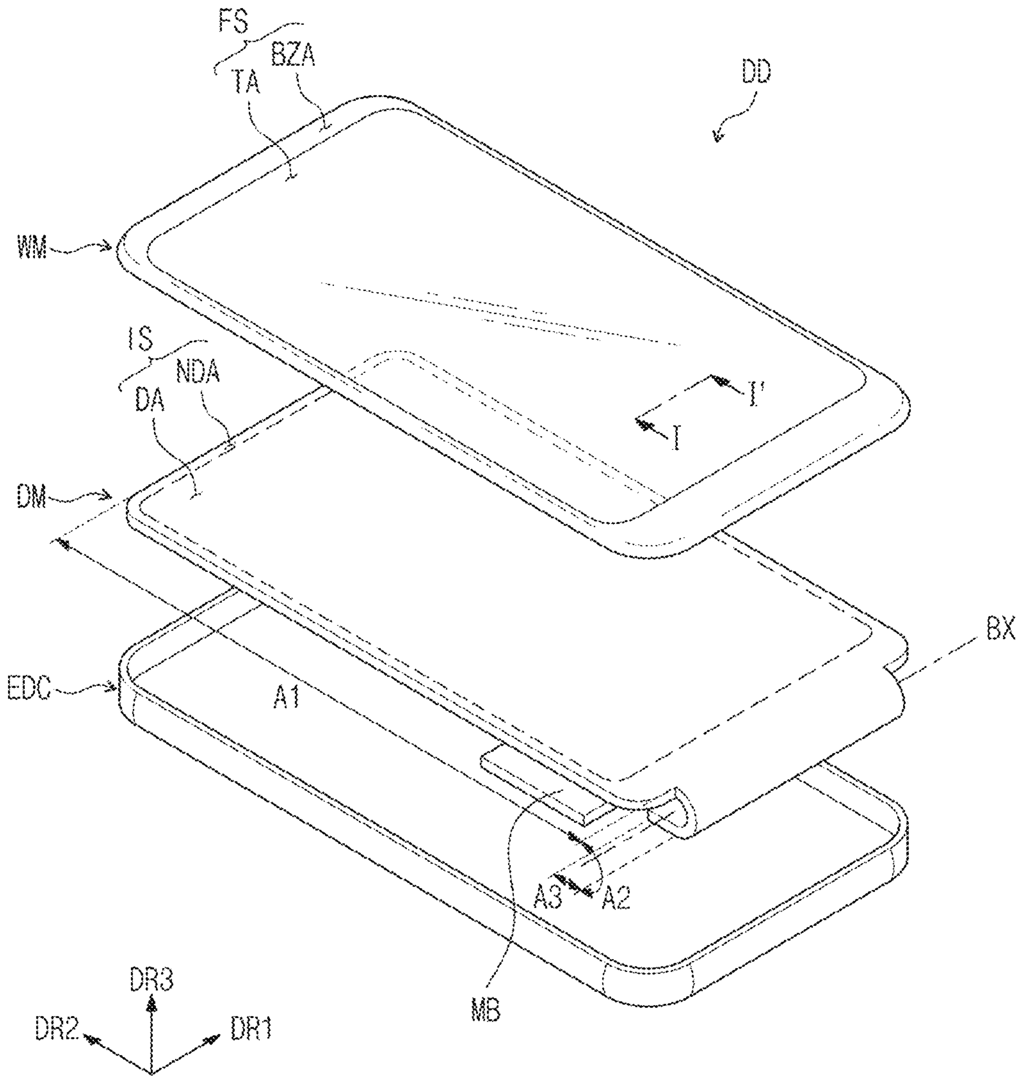
FIG. 1B is an exploded perspective view of a display device according to an embodiment of the invention.
Figure 1C:
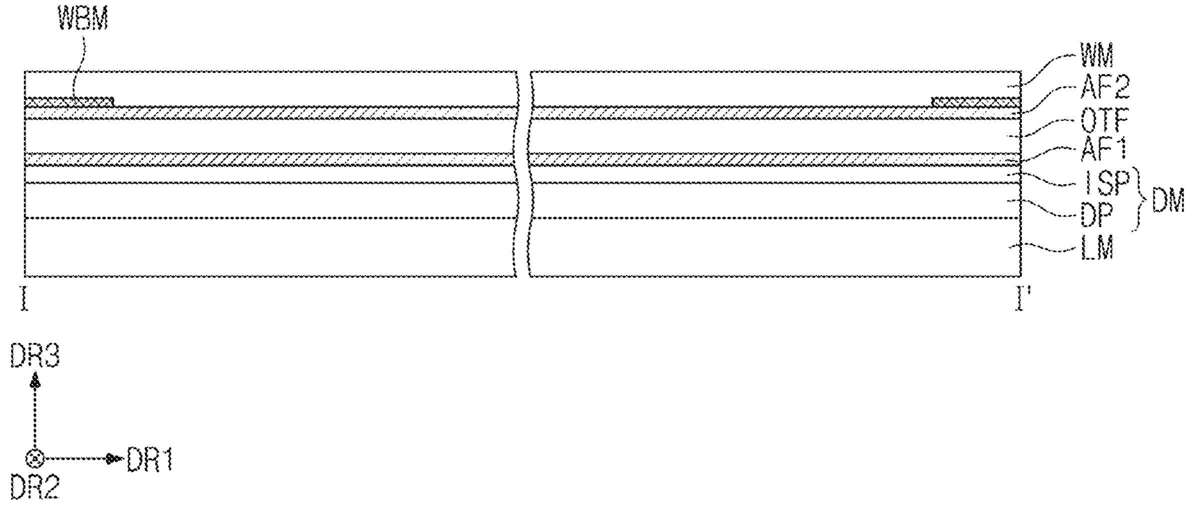
FIG. 1C is a cross-sectional view of a display device taken along line I-I' of FIG. 1B.

FIG. 1A is a perspective view of a display device according to an embodiment. FIG. 1B is an exploded perspective view of a display device according to an embodiment. FIG. 1C is a cross-sectional view of a display device taken along line I-I' of FIG. 1B.

Referring to FIGS. 1A to 1C, a display device DD may be a device which is activated and displays an image according to an electric signal. In an embodiment, for example, the display device DD may include a large-size device such as a television, an outdoor advertising board, and the like and a small or medium-size device such as a monitor, a mobile phone, a tablet PC, a computer, a navigation device, a game machine, and the like. The examples of the display device DD are merely illustrative, and the display device DD is not limited to any one of the examples unless it deviates from the invention. In the present embodiment, a mobile phone is illustrated as an example of the display device DD.

Referring to FIG. 1A, in a plan view, the electronic device DD may have a rectangular shape having short sides extending in a first direction DR1 and long sides extending in a second direction DR2 intersecting the first direction DR1. However, an embodiment of the invention is not limited thereto, and the display device DD may have various shapes such as a circle and a polygon in another embodiment.

The display device DD of an embodiment may be flexible. The term "flexible" represents a bendable characteristic, and may encompass any structure that is completely folded or capable of being bent to a degree of several nanometers. In an embodiment, for example, the flexible display device DD may include a curved display device or foldable display device. However, an embodiment of the invention is not limited thereto, and the display device DD may be rigid in another embodiment.

The display device DD may display an image IM in a third direction DR3 on a display surface parallel to each of the first direction DR1 and the second direction DR2. The image IM provided by the display device DD may include not only a moving image but also a still image. FIG. 1A illustrates a clock window and icons as examples of the image IM.

The display surface, on which the image IM is displayed, may correspond to a front surface of the display device DD, which may correspond to a front surface FS of a window WM. Although FIG. 1A illustrates a planar display surface as an example, an embodiment of the invention is not limited thereto, and the display surface of the display device DD may include a curved surface bent from at least one side of a plane in another embodiment.

A front surface (or upper surface) and a rear surface (or lower surface) of each of members constituting the display device DD may oppose each other in the third direction DR3, and a normal direction of each of the front surface and the rear surface may be substantially parallel with the third direction DR. A separation distance between the front surface and the rear surface defined according to the third direction DR3 may correspond to a thickness of a member (or unit). Herein, the term "in a plan view" may be defined as a state viewed in the third direction DR3. Herein, the term "in a cross-sectional view" may be defined as a state viewed in the first direction DR1 or the second direction DR2. The directions indicated by the first to third directions DR1 to DR3 are relative concept and thus may be changed to other directions.

Referring to FIGS. 1A and 1B, the display device DD may include the window WM, a display module DM, and a case EDC. The window WM may be coupled to the case EDC to form an exterior of the display device DD and provide an internal space for accommodating components of the display device DD.

The window WM may be arranged on the display module DM. The window WM may have a shape corresponding to a shape of the display module DM. The window WM may cover an entire outer side of the display module DM and may protect the display module DM from an external impact and scratch.

The window WM may include an optically clear insulating material. In an embodiment, for example, the window WM may include a glass substrate or a polymer substrate. The window WM may have a single-layer or multi-layer structure. The window WM may further include functional layers such as an anti-fingerprint layer, a phase control layer, and a hard coating layer.

The front surface FS of the window WM may include a transmission area TA and a bezel area BZA. The transmission area TA of the window WM may be an optically clear area. The window WM may transmit, through the transmission area TA, the image IM provided by the display module DM, and a user may view the image IM.

The bezel area BZA of the window WM may be as an area printed with a light shielding pattern WBM including a predetermined color (see FIG. 1C). The bezel area BZA of the window WM may prevent a component of the display module DM arranged overlapping the bezel area BZA from being externally viewed.

The bezel area BZA may be adjacent to the transmission area TA. A shape of the transmission area TA may be substantially defined by the bezel area BZA. In an embodiment, for example, the bezel area BZA may be arranged outside the transmission area TA and surround the transmission area TA. However, this is merely illustrative, and the bezel area BZA may be adjacent to only one side of the transmission area TA, or may not be provided. Furthermore, the bezel area BZA may be arranged on a side surface of the display device DD rather than the front surface of the display device DD.

As illustrated in FIGS. 1B and 1C, the display module DM may be arranged between the window WM and the case EDC. The image IM provided by the display device DD may be displayed on a front surface IS of the display module DM. The front surface IS of the display module DM may include a display area DA and a non-display area NDA. The display area DA may be an area which is activated and displays the image IM according to an electric signal. According to an embodiment, the display area DA of the display module DM may correspond to the transmission area TA of the window WM.

In the present disclosure, the wording "area/portion corresponds to another area/portion" represents "overlapping each other", but is not limited to cases in which the area/portions have the same size and/or the same shape.

The non-display area NDA may be adjacent to an outer side of the display area DA. In an embodiment, for example, the non-display area NDA may surround the display area DA. However, an embodiment of the invention is not limited thereto, and the non-display area NDA may be defined in various shapes.

The non-display area NDA may be an area in which a driving circuit or driving wiring for driving devices arranged in the display area DA, various signal lines for providing electric signals, and pads are arranged. The non-display area NDA of the display module DM may correspond to the bezel area BZA of the window WM. Components of the display module DM arranged in the non-display area NDA may be prevented by the bezel area BZA from being externally viewed.

The display module DM may include a display panel DP and an input sensing layer ISP. The display panel DP according to an embodiment of the invention may be an emissive display panel, but is not particularly limited. In an embodiment, for example, the display panel DP may be an organic light-emitting display panel, an inorganic light-emitting display panel, or a quantum dot light-emitting display panel. An emission layer of the organic light-emitting display panel may include an organic light-emitting material, and an emission layer of the inorganic light-emitting display panel may include an inorganic light-emitting material. An emission layer of the quantum dot light-emitting display panel may include quantum dots, quantum rods, etc. The display panel DP is described as an organic light-emitting display panel below.

The input sensing layer ISP may be directly arranged on the display panel DP. According to an embodiment of the invention, the input sensing layer ISP may be disposed on the display panel DP through a continuous process. That is, when the input sensing layer ISP is directly arranged on the display panel DP, an adhesive film is not arranged between the input sensing layer ISP and the display panel DP.

The display panel DP generates the image IM, and the input sensing layer ISP obtains coordinate information about an external input (e.g., a touch event).

The display module DM may include a first region A1, a second region A2, and a third region A3 arranged in the second direction DR2. The first region A1 may be a region corresponding to the display surface IS. The second region A2 and the third region A3 may be included in the non-display area NDA. The second region A2 may be a bending region that is bent with respect to a bending axis BX, and the first and third regions A1 and A3 may be non-bending regions. In the first direction DR1, lengths of the second region A2 and the third region A3 may each be equal to or smaller than a length of the first region A1. A region having a short length in a bending axis direction (i.e., the first direction DR1) may be more easily bent.

The display device DD may further include a circuit board MB connected to the display module DM. The circuit board MB may be connected to the third region A3 of the display module DM. The circuit board MB may generate an electric signal provided to the display module DM. In an embodiment, for example, the circuit board MB may include a timing controller, which generates a signal provided to a driving unit of the display module DM in response to control signals received externally.

At least a portion (e.g., the second region A2) of the non-display area NDA of the display module DM may be bent. The circuit board MB connected to the third region A3 of the display module DM may be arranged and assembled so as to overlap the rear surface of the display module DM in a plan view. However, an embodiment of the invention is not limited thereto, and the display module DM and the circuit board MB may be connected to each other through a flexible circuit film connected to one ends of the display module DM and the circuit board MB in another embodiment.

The display device DD according to an embodiment may further include an optical film OTF and a lower module LM. The optical film OTF reduces a reflection ratio of external light incident from above the window WM. The optical film OTF according to an embodiment of the invention may include a phase retarder and a polarizer. The phase retarder may be a film type or a liquid coating type, and may include a λ/2 phase retarder and/or a λ/4 phase retarder. The polarizer may also be a type of a film or a type of a liquid crystal coating. The film type may include a stretched synthetic resin film, and the liquid crystal coating type may include liquid crystals arranged in a predetermined array. The phase retarder and the polarizer may be implemented as one polarization film. The optical film OTF may further include a protective film arranged on or below the polarization film.

The optical film OTF may be arranged on the input sensing layer ISP. That is, the optical film OTF may be arranged between the input sensing layer ISP and the window WM. The input sensing layer ISP, the optical film OTF, and the window WM may be coupled to each other through an adhesive film. A first adhesive film AF1 is arranged between the input sensing layer ISP and the optical film OTF, and a second adhesive film AF2 is arranged between the optical film OTF and the window WM. Therefore, the optical film OTF is coupled to the input sensing layer ISP by the first adhesive film AF1, and the window WM is coupled to the optical film OTF by the second adhesive film AF2.

In an example of the invention, the first and second adhesive films AF1 and AF2 may each include an optically clear adhesive ("OCA") film. However, a material of each of the first and second adhesive films AF1 and AF2 is not limited thereto, and may include a typical adhesive. In an embodiment, for example, the first and second adhesive films AF1 and AF2 may each include a pressure sensitive adhesive ("PSA"), an optically clear adhesive (OCA) or optically clear resin ("OCR").

Aside from the optical film OTF, a functional layer for performing another function, for example, a protective layer, may be further arranged between the display module DM and the window WM.

The lower module LM is arranged on the rear surface of the display module DM. The lower module LM may improve impact resistance of the display device DD by being arranged on the rear surface of the display module DM. The lower module LM may be fixed to the rear surface of the display module DM through an adhesive film. The adhesive film may include a pressure sensitive adhesive (PSA), an optically clear adhesive (OCA) or optically clear resin (OCR).

The case EDC may be arranged under the display module DM and may accommodate the display module DM. The case EDC may include a material having a relatively high rigidity, such as glass, plastic, or metal materials. The case EDC may protect the display module DM by absorbing an externally applied impact or preventing foreign material, moisture, or the like from permeating the display module DM.

Figure 2:
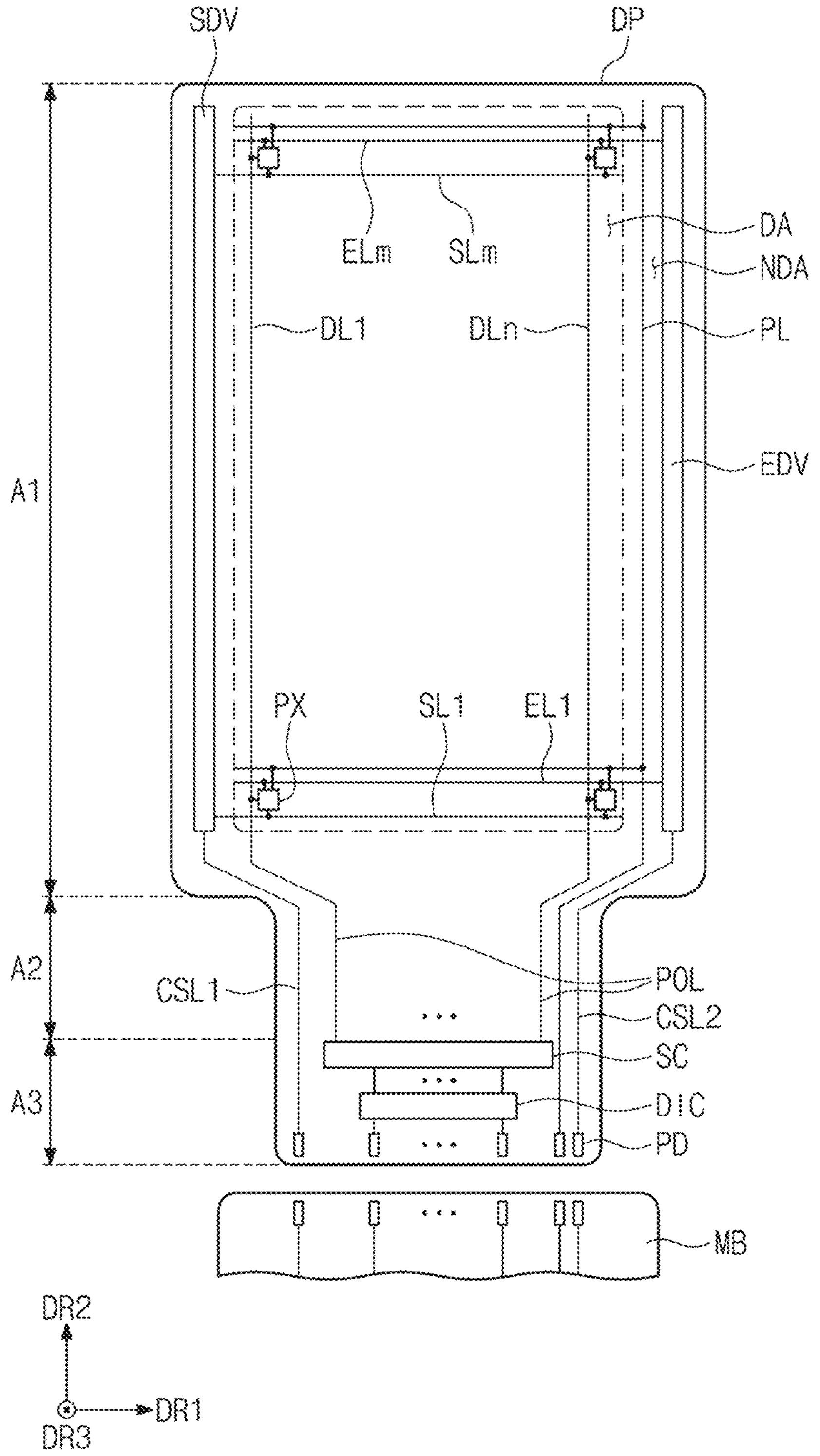
FIG. 2 is a plan view illustrating a display panel according to an embodiment of the invention.

FIG. 2 is a planar view illustrating a display panel according to an embodiment of the invention;

Referring to FIG. 2, the display panel DP according to an embodiment of the invention may be divided into a first region A1, a second region A2, and a third region A3. The first to third regions A1 to A3 of the display panel DP illustrated in FIG. 2 correspond to the first to third regions A1 to A3 of the display module DM described with reference to FIG. 1B, respectively. In the present disclosure, the wording "region/portion corresponds to another region/portion" represents "overlapping each other", but is not limited to cases in which the regions/portions have the same area size.

The display panel DP according to an embodiment may include a display area DA in which pixels PX are arranged and a non-display area NDA adjacent to the display area DA. The display area DA and the non-display area NDA correspond to the display area DA and the non-display area NDA of the display module DM described with reference to FIG. 1B, respectively. The display area DA corresponds to a region in which the pixels PX are arranged in the first region A1, and the non-display area NDA includes the first region A1 except for the region in which the pixels PX are arranged, the second region A2, and the third region A3.

The display panel DP may include a scan driver SDV, an emission driver EDV, a selection circuit SC, and a driving chip DIC which are disposed in the non-display area NDA. The driving chip DIC may include a data driver.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, and a plurality of pads PD. Here, m and n are natural numbers. The pixels PX may be connected to the scan lines SL1 to SLm, the data lines DL1 to DLn, and the emission lines EL1 to ELm.

The scan lines SL1 to SLm may extend in the first direction DR1 and may be connected to the scan driver SDV. The data lines DL1 to DLn may extend from the first region A1 to the third area A3 via the second area A2 along the second direction DR2, and may be connected to the driving chip DIC arranged in the third region A3. The emission lines EL1 to ELm may extend in the first direction DR1 and may be connected to the emission driver EDV.

The power line PL may include a portion extending in the first direction DR1 and a portion extending in the second direction DR2. The portion extending in the first direction DR1 and the portion extending in the second direction DR2 may be arranged on different layers. The portion of the power line PL extending in the second direction DR2 may extend from the first region A1 to the third region A3 via the second region A2. The power line PL may provide a reference voltage to the pixels PX.

The first control line CSL1 may be connected to the scan driver SDV, and may extend from the first region A1 to the third region A3 via the second region A2. The second control line CSL2 may be connected to the emission driver EDV, and may extend from the first region A1 to the third region A3 via the second region A2.

The pads PD may be arranged adjacent to an end of the third region A3. The driving chip DIC, the power line PL, the first control line CSL1, and the second control line CSL2 may be connected to the pads PD. The circuit board MB may overlap an end of the third region A3 of the display panel DP and may be arranged on the display panel DP in the plan view. The circuit board MB may include circuit pads corresponding to the pads PD and may be electrically connected to the pads PD through an anisotropic conductive adhesive layer.

The selection circuit SC may be arranged between the data lines DL1 to DLn and the driving chip DIC. The selection circuit SC electrically connects a portion (e.g., a first group) of the data lines LD1 to LDn to the driving chirp DIC during a first period, and electrically connects another portion (e.g., a second group) of the data lines DL1 to DLn to the driving chip DIC during a second period. In an example of the invention, the first group may include odd-numbered data lines among the data lines DL1 to DLn, and the second group may include even-numbered data lines among the data lines DL1 to DLn.

In an example of the invention, the selection circuit SC may be arranged in the non-display area NDA. In particular, the selection circuit SC may be arranged in the third region A3 and positioned on the display module DM together with the driving chip DIC. In this case, compared to a display panel in which the selection circuit SC is arranged in the first region A1, an area size of the non-display area NDA in the first region A1 may be reduced, and, as a result, the display device DD having a narrow bezel may be implemented.

The selection circuit SC and the data lines DL1 to DLn may be electrically connected through fan-out lines POL. The fan-out lines POL may be arranged in the second region A2, may be connected to the data lines DL1 to DLn in the first region A1, and may be connected to the selection circuit SC in the third region A3.

Figure 3:
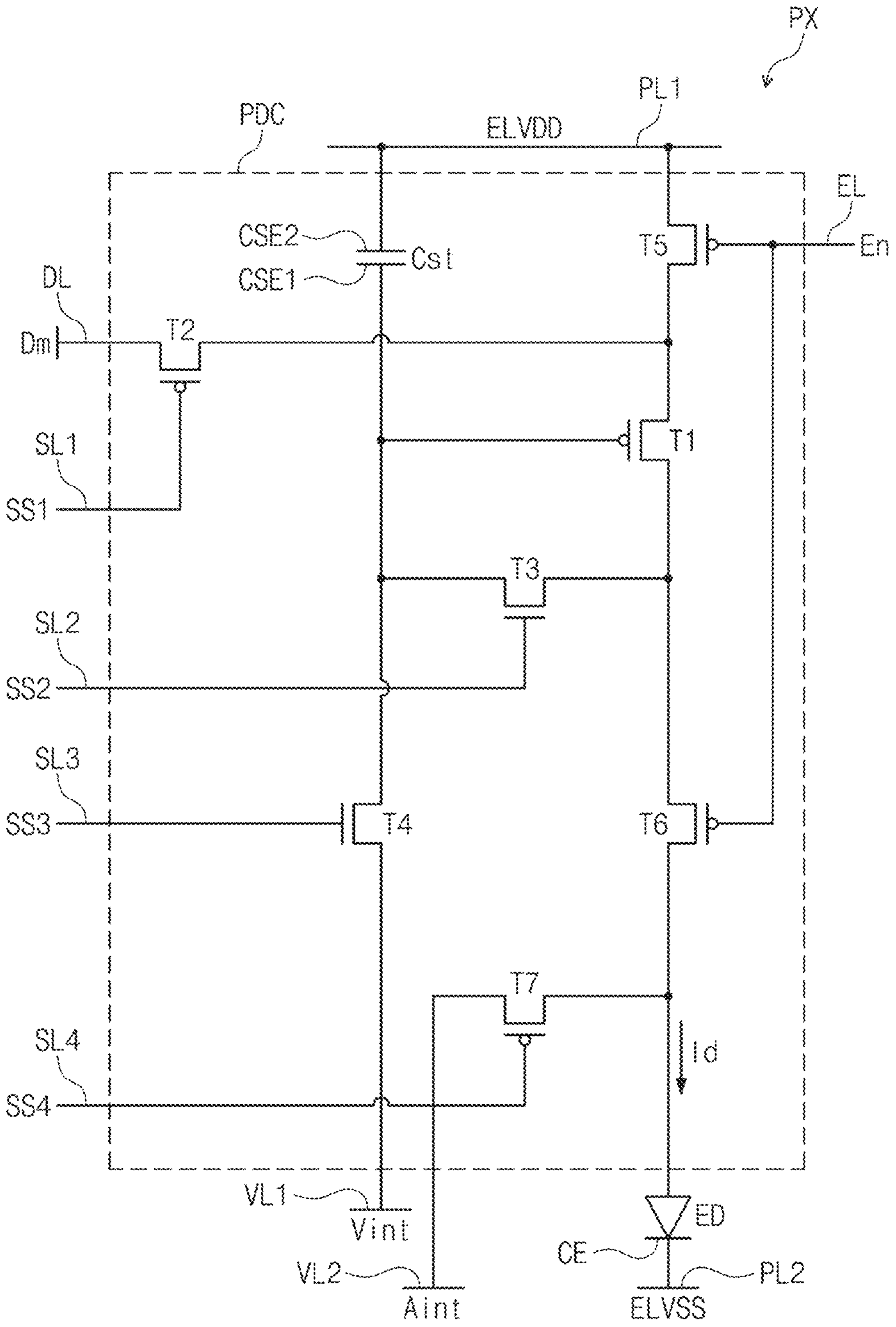
FIG. 3 is a circuit diagram of a pixel according to an embodiment of the invention.

FIG. 3 is a circuit diagram of a pixel according to an embodiment of the invention. FIG. 3 illustrates an equivalent circuit diagram of one pixel PX among the plurality of pixels PX illustrated in FIG. 2.

Referring to FIG. 3, the pixel PX may include a light-emitting element ED and a pixel driving circuit PDC.

The pixel driving circuit PDC may include a plurality of transistors T1 to T7 and a storage capacitor Cst. The pixel driving circuit PDC may be electrically connected to signal lines SL1, SL2, SL3, SL4, EL, and DL, a first initialization voltage line VL1, a second initialization voltage line VL2 (or an anode initialization voltage line), a first power line PL1, and a second power line PL2. In an embodiment, at least one of the above lines, for example, the first power line PL1, may be shared between neighboring pixels PX.

The plurality of transistors T1 to T7 may include a driving transistor T1 (or a first transistor), a switching transistor T2 (or a second transistor), a compensation transistor T3 (or a third transistor), a first initialization transistor T4 (or a fourth transistor), a first control transistor T5 (or a fifth transistor), a second control transistor T6 (or a sixth transistor), and a second initialization transistor T7 (or a seventh transistor).

The light-emitting element ED may include a first electrode (e.g., an anode electrode) and a second electrode CE (e.g., a cathode electrode). The first electrode of the light-emitting element ED may be connected to the driving transistor T1 via the second control transistor T6 so as to receive a driving current Id, and the second electrode CE may receive a second driving voltage ELVSS through the second power line PL2. The light-emitting element ED may generate light having luminance corresponding to the driving current Id. In an embodiment, the second electrode CE of the light-emitting element ED may be provided as a common electrode commonly connected to the pixels PX.

A portion of the plurality of transistors T1 to T7 may be provided as an n-channel MOSFET ("NMOS") and the others may be provided as a p-channel MOSFET ("PMOS"). In an embodiment, for example, among the plurality of transistors T1 to T7, the compensation transistor T3 and the first initialization transistor T4 may be provided as an NMOS, and the others may be provided as a PMOS.

In another embodiment, among the plurality of transistors T1 to T7, the compensation transistor T3, the first initialization transistor T4, and the second initialization transistor T7 may be provided as an NMOS, and the others may be provided as a PMOS. Alternatively, only one of the plurality of transistors T1 to T7 may be provided as an NMOS, and the others may be provided as a PMOS. Alternatively, the plurality of transistors T1 to T7 may all be provided as an NMOS or a PMOS.

The signal lines may include a first scan line SL1 for transferring a first scan signal SS1, a second scan line SL2 for transferring a second scan signal SS2, a third scan line SL3 for transferring a third scan signal SS3 to the first initialization transistor T4, an emission control line EL for transferring an emission control signal En to the first control transistor T5 and the second control transistor T6, a fourth scan line SL4 for transferring a fourth scan signal S S4 to the second initialization transistor T7, and a data line DL for transferring a data signal Dm.

The first power line PL1 may transfer a first driving voltage ELVDD to the driving transistor T1, and the first initialization voltage line VL1 may transfer a first initialization voltage Vint for initializing a gate electrode of the driving transistor T1. The second initialization voltage line VL2 may transfer a second initialization voltage Aint for initializing the first electrode of the light-emitting element ED.

The gate electrode of the driving transistor T1 may be connected to the storage capacitor Cst, a first electrode (or a source electrode) of the driving transistor T1 may be connected to the first power line PL1 via the first control transistor T5, and a second electrode (or a drain electrode) of the driving transistor T1 may be electrically connected to the first electrode of the light-emitting element ED via the second control transistor T6. The driving transistor T1 may receive the data signal Dm according to a switching operation of the switching transistor T2 and may supply the driving current Id to the light-emitting element ED.

A gate electrode of the switching transistor T2 may be connected to the first scan line SL1 for transferring the first scan signal SS1, a first electrode of the switching transistor T2 may be connected to the data line DL, and a second electrode of the switching transistor T2 may be connected to the first electrode of the driving transistor T1. The switching transistor T2 may be turned on in response to the first scan signal SS1 received through the first scan line SL1 and perform a switching operation for transferring, to the first electrode of the driving transistor T1, the data signal Dm transferred from the data line DL.

A gate electrode of the compensation transistor T3 is connected to the second scan line SL2. A first electrode of the compensation transistor T3 may be connected to the second electrode of the driving transistor T1, a second electrode of the compensation transistor T3 may be connected to a first electrode CSE1 of the storage capacitor Cst and the gate electrode of the driving transistor T1. The compensation transistor T3 may be turned on in response to the second scan signal SS2 received through the second scan line SL2, the gate electrode and the second electrode of the driving transistor T1 are electrically connect through the turned-on compensation transistor T3 to diode-connect the driving transistor T1.

A gate electrode of the first initialization transistor T4 may be connected to the third scan line SL3. A first electrode of the first initialization transistor T4 may be connected to the first initialization voltage line VL1, a second electrode of the first initialization transistor T4 may be connected to the first electrode CSE1 of the storage capacitor Cst, the second electrode of the compensation transistor T3, and the gate electrode of the driving transistor T1. The first initialization transistor T4 may be turned on in response to the third scan signal SS3 received through the third scan line SL3, and may transfer the first initialization voltage Vint to the gate electrode of the driving transistor T1 to perform an initialization operation for initializing the gate electrode of the driving transistor T1 with the first initialization voltage Vint.

A gate electrode of the first control transistor T5 may be connected to the emission control line EL, a first electrode of the first control transistor T5 may be connected to the first power line PL1, and a second electrode of the first control transistor T5 may be connected to the first electrode of the driving transistor T1 and the second electrode of the switching transistor T2.

A gate electrode of the second control transistor T6 is connected to the emission control line EL, a first electrode of the second control transistor T6 is connected to the second electrode of the driving transistor T1 and the first electrode of the compensation transistor T3. A second electrode of the second control transistor T6 is connected to the first electrode of the light-emitting element ED.

The first control transistor T5 and the second control transistor T6 may be simultaneously turned on in response to the emission control signal En received through the emission control line EL so as to transfer the first driving voltage ELVDD to the light-emitting element ED and allow the driving current Id to flow to the light-emitting element ED. Alternatively, the first control transistor T5 and the second control transistor T6 may be connected to different emission control lines, respectively.

A gate electrode of the second initialization transistor T7 may be connected to the fourth scan line SL4, and a first electrode of the second initialization transistor T7 may be connected to the second initialization voltage line VL2 so as to receive the second initialization voltage Aint. A second electrode of the second initialization transistor T7 is connected to the second electrode of the second control transistor T6 and the first electrode of the light-emitting element ED. The second initialization transistor T7 may be turned on in response to the fourth scan signal S S4 received through the fourth scan line SL4 to initialize the first electrode of the light-emitting element ED with the second initialization voltage Aint.

Alternatively, the second initialization transistor T7 may be connected to the emission control line EL and driven according to the emission control signal En. Positions of the first and second electrodes of each transistor may be changed with each other according to the type (p-type or n-type) of each transistor.

The storage capacitor Cst may include the first electrode CSE1 and a second electrode CSE2. The first electrode CSE1 of the storage capacitor Cst is connected to the gate electrode of the driving transistor T1, and the second electrode CSE2 of the storage capacitor Cst is connected to the first power line PL1. The storage capacitor Cst may store charge corresponding a difference between potential of the gate electrode of the driving transistor T1 and the first driving voltage ELVDD.

Specific operation of each pixel PX according to an embodiment is described below.

In an initialization period, when the third scan signal SS3 is supplied through the third scan line SL3, the first initialization transistor T4 is turned on in response to the third scan signal SS3, and the gate electrode of the driving transistor T1 is initialized by the first initialization voltage Vint supplied from the first initialization voltage line VL1.

In a data programming period, when the first scan signal SS1 and the second scan signal SS2 are supplied through the first scan line SL1 and the second scan line SL2, the switching transistor T2 and the compensation transistor T3 are turned on in response to the first scan signal SS1 and the second scan signal SS2. Here, the driving transistor T1 is diode-connected by the compensation transistor T3 turned on, and is forward biased.

Therefore, a compensation voltage "Dm+Vth" (where Vth has a negative (−) value) is applied to the gate electrode of the driving transistor T1. The compensation voltage "Dm+Vth" is a voltage reduced from the data signal Dm supplied from the data line DL by as much as a threshold voltage Vth of the driving transistor T1.

The first driving voltage ELVDD and the compensation voltage "Dm+Vth" are applied to both terminals of the storage capacitor Cst, and the storage capacitor Cst stores charge corresponding to a difference between voltages of the terminals.

In an emission period, the first control transistor T5 and the second control transistor T6 are turned on by the emission control signal En supplied from the emission control line EL. The driving current Id is generated according to a voltage difference between a voltage of the gate electrode of the driving transistor T1 and the first driving voltage ELVDD, and the driving current Id is supplied to the light-emitting element ED via the second control transistor T6.

In the present embodiment, at least one of the plurality of transistors T1 to T7 includes a semiconductor layer including oxide, and the others include a semiconductor layer including silicon. In detail, the driving transistor T1, which directly affects brightness of the display device DD (refer to FIG. 1A), may include a semiconductor layer including polycrystalline silicon having high reliability so that a high-definition display device may be implemented. An oxide semiconductor has high carrier mobility and low leakage current, and thus a voltage drop is not significant even if a driving time is long. That is, low-frequency driving is possible since a color change in an image due to a voltage drop is not significant during the low-frequency driving.

As described above, since an oxide semiconductor has low leakage current, an oxide semiconductor may be adopted as at least one of the compensation transistor T3 or the first initialization transistor T4 so as to prevent leakage current that may flow to the gate electrode of the driving transistor T1 and also reduce power consumption.

Figure 4:
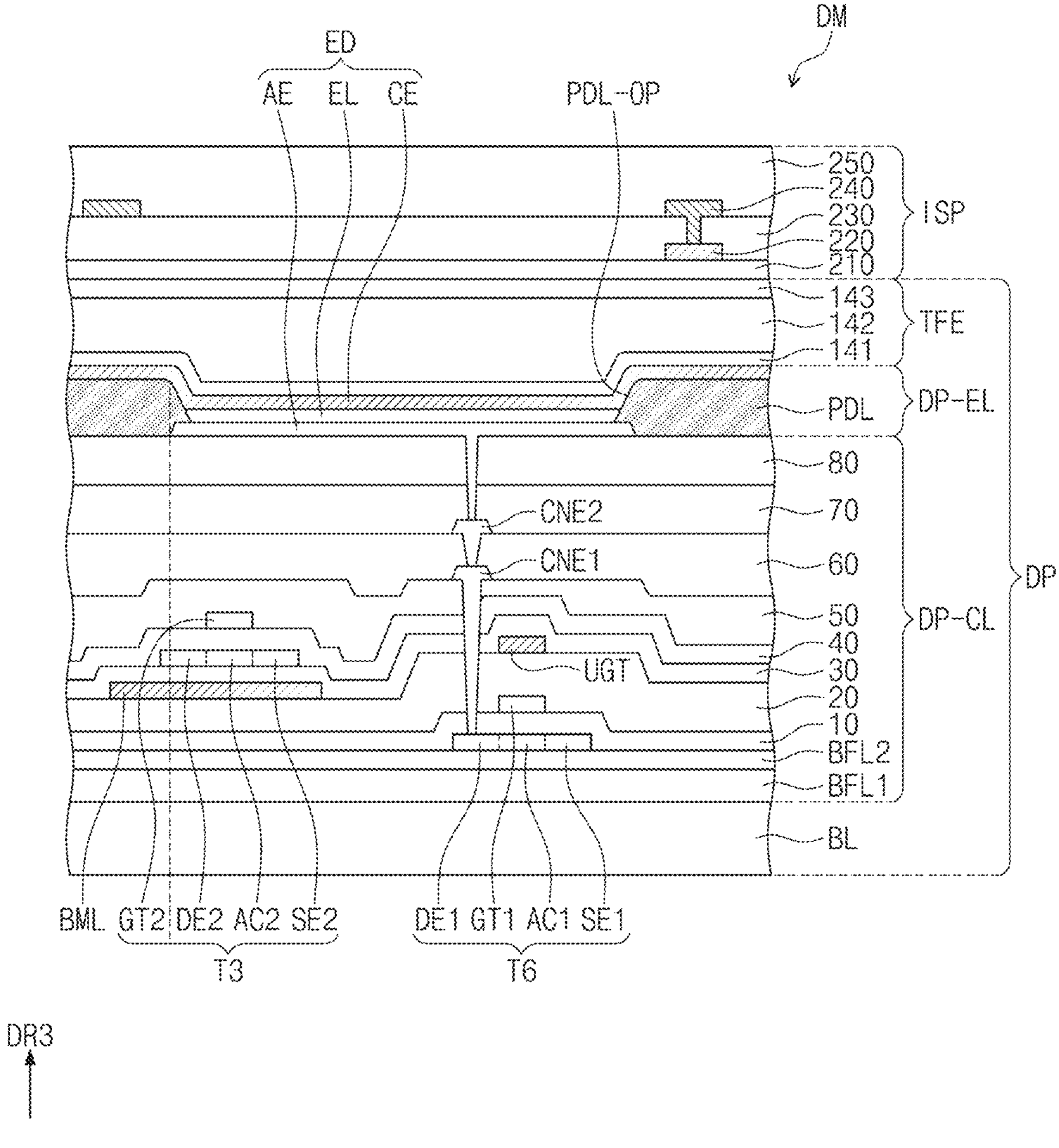
FIG. 4 is a cross-sectional view of a partial region of the display module illustrated in FIG. 1C.

FIG. 4 is a cross-sectional view of a partial region of the display module illustrated in FIG. 1C.

Referring to FIG. 4, the display module DM may include the display panel DP and the input sensing layer ISP directly arranged on the display panel DP. The display panel DP may include a base layer BL, a circuit element layer DP-CL, a light-emitting element layer DP-EL, and an encapsulation layer TFE.

The base layer BL may provide a base surface on which the circuit element layer DP-CL is arranged. The circuit element layer DP-CL may be arranged on the base layer BL. The circuit element layer DP-CL may include an insulating layer, a semiconductor pattern, a conductive pattern, a signal line, and/or the like. An insulating layer, a semiconductor layer, and a conductive layer may be disposed on the base layer BL through coating, deposition, or the like, and, thereafter, the insulating layer, the semiconductor layer, and the conductive layer may be selectively patterned by repeating a photolithography process multiple times. Thereafter, the semiconductor pattern, conductive pattern, and signal line included in the circuit element layer DP-CL may be formed.

At least one inorganic layer is disposed on an upper surface of the base layer BL. In the present embodiment, the display panel DP is illustrated as including two buffer layers BFL1 and BFL2 (i.e., first and second buffer layers). The first and second buffer layers BFL1 and BFL2 may improve bonding force between the base layer BL and the semiconductor pattern. The first and second buffer layers BFL1 and BFL2 may include silicon oxide layers and silicon nitride layers, which may be alternately stacked.

A first semiconductor pattern may be arranged on the second buffer layer BFL2. The first semiconductor pattern may include polysilicon. However, an embodiment of the invention is not limited thereto, and, thus, the first semiconductor pattern may include amorphous silicon or metal oxide.

FIG. 4 only illustrates the first semiconductor pattern partially, and the first semiconductor pattern may be further arranged in another region. The first semiconductor pattern may be arranged over the pixels PX (refer to FIG. 2) according to a particular rule. The first semiconductor pattern may have different electric properties according to whether the semiconductor pattern is doped. The first semiconductor pattern may include a first region having high conductivity and a second region having low conductivity. The first region may be doped with an N-type dopant or P-type dopant. A P-type transistor includes a doped region doped with a P-type dopant. The second region may be a non-doped region or may be doped at a lower concentration than that of the first region.

The first region may have higher conductivity than that of the second region, and may substantially function as an electrode or a signal line. The second region may substantially correspond to an active region (or a channel region) of a transistor. Namely, the second region of the first semiconductor pattern may be a channel region of a transistor, and the first region of the first semiconductor pattern may be a source region or drain region of a transistor.

FIG. 4 illustrates, as an example, the light-emitting element ED, the compensation transistor T3 and the second control transistor T6 of the pixel driving circuit PDC (see FIG. 3).

A source region SE1, a channel region AC1, and a drain region DE1 of the second control transistor T6 may be formed from the first semiconductor pattern. The source region SE1 and the drain region DE1 may extend from the channel region AC1 in opposite directions in a cross-sectional view.

A first insulating layer 10 may be arranged on the second buffer layer BFL2. The first insulating layer 10 may commonly overlap the plurality of pixels PX, and may cover the first semiconductor pattern. The first insulating layer 10 may be an inorganic layer and/or organic layer, and may have a single-layer or multi-layer structure. The first insulating layer 10 may include at least one of aluminum oxide, titanium oxide, silicon oxide, silicon nitride, silicon oxynitride, zirconium oxide, or hafnium oxide. In the present embodiment, the first insulating layer 10 may be a single layer of a silicon oxide layer. Not only the first insulating layer 10 but also the insulating layer of the circuit element layer DP-CL described below may be an inorganic layer and/or organic layer, and may have a single-layer or multi-layer structure. The inorganic layer may include at least one of the above-mentioned materials, but is not limited thereto.

A gate electrode GT1 of the second control transistor T6 is arranged on the first insulating layer 10. The gate electrode GT1 may be a portion of a metal pattern. The gate electrode GT1 overlaps the channel region AC1 in the plan view. The gate electrode GT1 may function as a mask during a process of doping the first semiconductor pattern.

A second insulating layer 20 may be arranged on the first insulating layer 10, and may cover the gate electrode GT1. The second insulating layer 20 may commonly overlap the pixels PX. The second insulating layer 20 may be an inorganic layer and/or organic layer, and may have a single-layer or multi-layer structure. In the present embodiment, the second insulating layer 20 may be a single layer of a silicon oxide layer.

An upper gate electrode UGT of the second control transistor T6 is arranged on the second insulating layer 20. The upper gate electrode UGT may be a portion of a metal pattern. The upper gate electrode UGT overlaps the gate electrode GT1 of the second control transistor T6 in the plan view.

A third insulating layer 30 may be arranged on the second insulating layer 20. The third insulating layer 30 may commonly overlap the plurality of pixels PX, and may cover the upper gate electrode UGT. The third insulating layer 30 may have a single-layer or multi-layer structure. In an embodiment, for example, the third insulating layer 30 may have a multi-layer structure including a silicon oxide layer and a silicon nitride layer. A back metal layer BML may be arranged between the second insulating layer 20 and the third insulating layer 30. The back metal layer BML may receive a constant voltage or signal. The back metal layer BML may be arranged on the same layer as the upper gate electrode UGT of the second control transistor T6.

A second semiconductor pattern may be arranged on the third insulating layer 30. The second semiconductor pattern may include an oxide semiconductor. The oxide semiconductor may include a plurality of regions divided according to whether a metal oxide has been reduced. A region (hereinafter a reduction region) in which a metal oxide has been reduced has higher conductivity than a region (hereinafter a non-reduction region) in which a metal oxide has not been reduced. The reduction region substantially has a function of a source region/drain region of a transistor or a signal line. The non-reduction region substantially corresponds to an active region (or a channel region) of a transistor. Namely, the non-reduction region of the second semiconductor pattern may be a channel region of a transistor, the reduction region of the second semiconductor pattern may be a source region/drain region of a transistor.

A source region SE2, a channel region AC2, and a drain region DE2 of the compensation transistor T3 may be formed from the second semiconductor pattern. The source region SE2 and the drain region DE2 may extend from the channel region AC2 in opposite directions in a cross-sectional view.

A fourth insulating layer 40 may be arranged on the third insulating layer 30. The fourth insulating layer 40 may commonly overlap the plurality of pixels PX, and may cover the second semiconductor pattern. The fourth insulating layer 40 may include at least one of aluminum oxide, titanium oxide, silicon oxide, silicon nitride, silicon oxynitride, zirconium oxide, or hafnium oxide.

A gate electrode GT2 of the compensation transistor T3 is arranged on the fourth insulating layer 40. The gate electrode GT2 may be a portion of a metal pattern. The gate electrode GT2 overlaps the channel region AC2 in the plan view. The gate electrode GT2 may function as a mask during a process of doping the second semiconductor pattern.

A fifth insulating layer 50 may be arranged on the fourth insulating layer 40, and may cover the gate electrode GT2. The fifth insulating layer 50 may be an inorganic layer and/or organic layer, and may have a single-layer or multi-layer structure.

A first connection electrode CNE1 may be arranged on the fifth insulating layer 50. The first connection electrode CNE1 may be connected to the drain region DE1 of the second control transistor T6 through a contact hole penetrating the first to fifth insulating layers 10 to 50.

A sixth insulating layer 60 may be arranged on the fifth insulating layer 50. A second connection electrode CNE2 may be arranged on the sixth insulating layer 60. The second connection electrode CNE2 may be connected to the first connection electrode CNE1 through a contact hole penetrating the sixth insulating layer 60.

In an example of the invention, the second power line PL2 may be arranged on the sixth insulating layer 60. That is, the second power line PL2 may be arranged on the same layer as the second connection electrode CNE2. However, an embodiment of the invention is not limited thereto. Alternatively, the second power line PL2 may be arranged on the same layer as the first connection electrode CNE1.

A seventh insulating layer 70 may be arranged on the sixth insulating layer 60 and may cover the second connection electrode CNE2 and the second power line PL2. An eighth insulating layer 80 may be arranged on the seventh insulating layer 70.

Each of the sixth insulating layer 60, the seventh insulating layer 70, and the eighth insulating layer 80 may be an organic layer. In an embodiment, for example, the sixth insulating layer 60, the seventh insulating layer 70, and the eighth insulating layer 80 may each include general polymers such as benzocyclobutene ("BCB"), polyimide, hexamethyldisiloxane ("HMDSO"), polymethylmethacrylate ("PMMA"), or polystyrene ("PS"), or a polymer derivative having a phenol group, an acrylic polymer, an imidic polymer, an aryl ether polymer, an amidic polymer, a fluoric polymer, a p-xylene polymer, a vinyl alcohol polymer, and a blend thereof.

The light-emitting element layer DP-EL including the light-emitting element ED may be arranged on the circuit element layer DP-CL The light-emitting element ED may include a first electrode AE, an emission layer EL, and a second electrode CE. The second electrode CE may be connected to the pixels PX (see FIG. 2) and provided in a form of a common electrode.

The first electrode AE may be arranged on the eighth insulating layer 80. The first electrode AE may be a (semi) light-transmissive electrode or reflective electrode. In an embodiment, the first electrode AE may include a reflective layer formed of or including Ag, Mg, Al, Pt, Pd, Au, Ni, Nd, Ir, Cr, or a compound thereof and a transparent or semi-transparent electrode layer disposed on the reflective layer. The transparent or semitransparent electrode layer may include at least one selected from the group consisting of indium tin oxide ("ITO"), indium zinc oxide ("IZO"), indium gallium zinc oxide ("IGZO"), zinc oxide (ZnO), indium oxide (In2O3), and aluminum doped zinc oxide ("AZO"). In an embodiment, for example, the first electrode AE may be provided as ITO/Ag/ITO.

A pixel defining layer PDL may be arranged on the eighth insulating layer 80. The pixel defining layer PDL may have a property of absorbing light, and may have, for example, black color. The pixel defining layer PDL may include a black coloring agent. The black coloring agent may include a black dye or black pigment. The black coloring agent may include metals such as carbon black and chromium or oxides thereof.

The pixel defining layer PDL may cover a portion of the first electrode AE. In an embodiment, for example, a pixel opening PDL-OP that exposes a portion of the first electrode AE may be defined in the pixel defining layer PDL. An area overlapping the pixel opening PDL-OP in the display panel DP in the plan view may be defined as an emission area EA and another area may be defined as a non-emission area NEA. The light-emitting element ED may be provided in correspondence with the emission area EA.

The emission layer EL may be arranged on the first electrode AE. In the present embodiment, the emission layers EL may output light of at least one of blue color, red color, or green color.

The second electrode CE may be arranged on the emission layer EL. The second electrode CE may be commonly formed in the plurality of pixels PX (see FIG. 2) using an open mask.

Although not illustrated, a hole control layer may be arranged between the first electrode AE and the emission layer EL. The hole control layer may include a hole transport layer, and may further include a hole injection layer. An electron control layer may be arranged between the emission layer EL and the second electrode CE. The electron control layer may include an electron transport layer, and may further include an electron injection layer. The hole control layer and the electron control layer may be formed commonly in the plurality of pixels PX using the open mask.

The encapsulation layer TFE may be arranged on the light-emitting element layer DP-EL. The encapsulation layer TFE may include a first encapsulating inorganic layer 141, an encapsulating organic layer 142, and a second encapsulating inorganic layer 143, which are sequentially stacked, but layers constituting the encapsulation layer TFE are not limited thereto.

The first and second encapsulating inorganic layers 141 and 143 may protect the light-emitting element layer DP-EL from moisture and oxygen, and the encapsulating organic layer 142 may protect the light-emitting element layer DP-EL from foreign matter such as particles of dust. The first and second encapsulating inorganic layers 141 and 143 may include a silicon nitride layer, a silicon oxynitride layer, a silicon oxide layer, a titanium oxide layer, an aluminum oxide layer, or the like. The encapsulating organic layer 142 may include an acrylic organic layer, but is not limited thereto.

The input sensing layer ISP may be arranged on the display panel DP. The input sensing layer ISP may also be referred to as an input sensor or an input sensing panel. The input sensing layer ISP may include an insulating base layer 210, a first conductive layer 220, a sensing insulating layer 230, a second conductive layer 240, and a protective layer 250.

The insulating base layer 210 may be directly arranged on the display panel DP. The insulating base layer 210 may be an inorganic layer including at least one of silicon nitride, silicon oxynitride, or silicon oxide. Alternatively, the insulating base layer 210 may be an organic layer including epoxy resin, acryl resin, or imide-based resin. The insulating base layer 210 may have a single-layer structure, or may have a multi-layer structure laminated along the third direction DR3.

Each of the first conductive layer 220 and the second conductive layer 240 may have a single-layer structure, or may have a multi-layer structure laminated along the third direction DR3.

A conductive layer having a single-layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as PEDOT, metal nanowire, graphene, or the like.

A conductive layer having a multi-layer structure may include metal layers. The metal layers may have, for example, a triple-layer structure of titanium/aluminum/titanium. The conductive layer having a multi-layer structure may include at least one metal layer and at least one transparent conductive layer.

The sensing insulating layer 230 may be arranged between the first conductive layer 220 and the second conductive layer 240, and the protective layer 250 may be arranged so as to cover the second conductive layer 240 and the sensing insulating layer 230. The sensing insulating layer 230 and the protective layer 250 may include an inorganic layer. The inorganic layer may include at least one of aluminum oxide, titanium oxide, silicon oxide, silicon nitride, silicon oxynitride, zirconium oxide, or hafnium oxide. Alternatively, the sensing insulating layer 230 and the protective layer 250 may include an organic layer. The organic layer may include at least one of acrylic resin, methacrylic resin, polyisoprene, vinyl-based resin, epoxy-based resin, urethane-based resin, cellulosic resin, siloxane-based resin, polyimide-based resin, polyamide-based resin, or perylene-based resin.

Figure 5A:
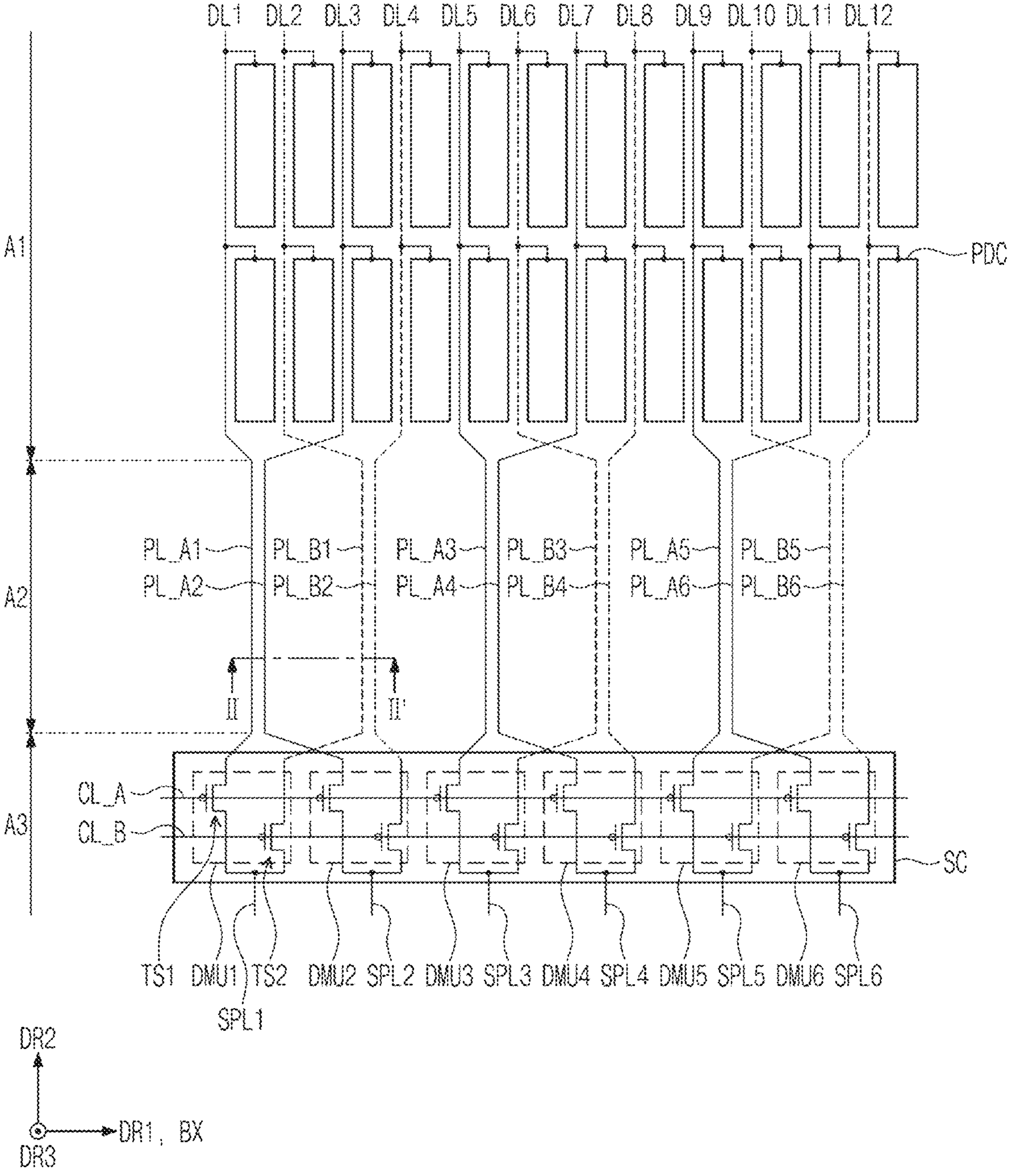
FIG. 5A is an enlarged plan view of a partial region of the display panel illustrated in FIG. 2.
Figure 5B:
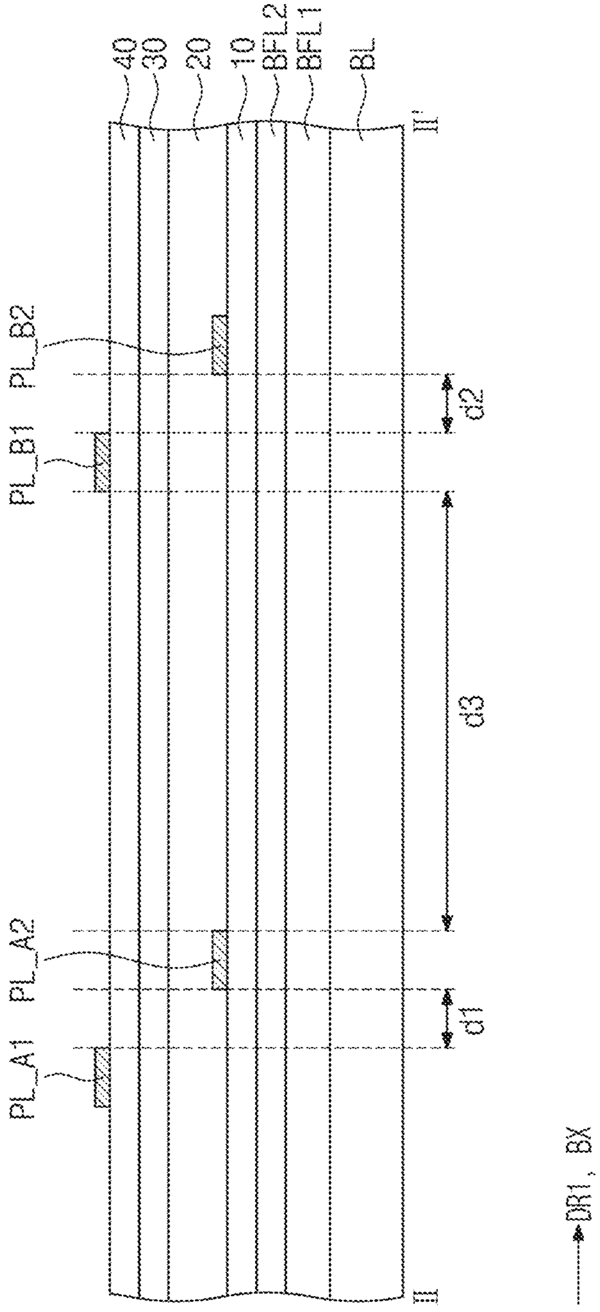
FIG. 5B is a cross-sectional view of the display panel taken along line II-IF of FIG. 5A.
Figure 6:
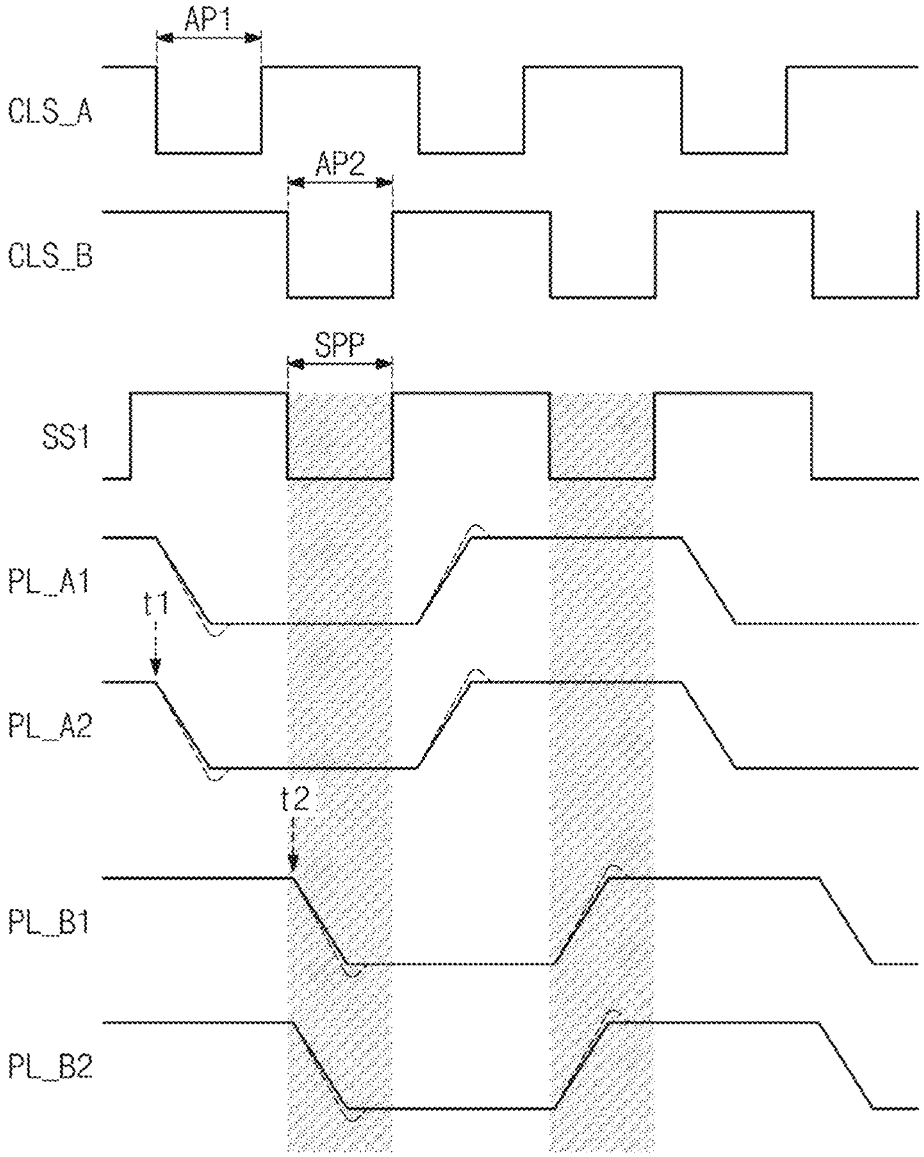
FIG. 6 is a waveform diagram illustrating operation of the selection circuit illustrated in FIG. 5A.

FIG. 5A is an enlarged plan view of a partial region of the display panel illustrated in FIG. 2, and FIG. 5B is a cross-sectional view of the display panel taken along line II-II' illustrated in FIG. 5A. FIG. 6 is a waveform diagram illustrating operation of the selection circuit illustrated in FIG. 5A.

Referring to FIG. 5A, the display panel DP (see FIG. 2) according to an embodiment of the invention may include pixels PX (see FIG. 2), data lines DL1 to DL12, fan-out lines PL_A1 to PL_A6 and PL_B1 to PL_B6 (corresponding to fan-out lines POL in FIG. 2), signal selection lines CL_A and CL_B, signal supply lines SPL1, SPL2, SPL3, SPL4, SPL5 and SPL6, and the selection circuit SC.

The pixels PX and the data lines DL1 to DL12 may be arranged in the first region A1 of the display panel DP. For convenience, FIG. 5A illustrates 12 data lines (first to 12th data lines DL1 to DL12), but the number of data lines is not limited thereto. The first to 12th data lines DL1 to DL12 may extend in the second direction DR2 and may be arranged in the first direction DR1 in another embodiment.

A plurality of pixel driving circuits PDC may be connected to the first to 12th data lines DL1 to DL12, respectively. In particular, the first to 12th data lines DL1 to DL12 may each be connected to the switching transistor T2 (see FIG. 3) of each pixel driving circuit PDC.

In an example of the invention, the first to 12th data lines DL1 to DL12 may be divided into two groups (i.e., a first group and a second group) that are driven during two periods, respectively, in a time division manner. The data lines DL1, DL3, DL5, DL7, DL9, and DL11 (e.g., odd-numbered data lines) of the first group are driven during a first period of the two periods, and the data lines DL2, DL4, DL6, DL8, DL10, and DL12 (e.g., even-numbered data lines) of the second group are driven during a second period of the two periods. The second period is temporally separated from the first period. The first period and the second period may alternately occur.

The selection circuit SC, the signal selection lines CL_A and CL_B, and the signal supply lines SPL1 to SPL6 may be arranged in the third region A3 of the display panel DP. The selection circuit SC may include a plurality of demux units DMU1 to DMU6 (e.g., demultiplexer units). The demux units DMU1 to DMU6 may be arranged between the fan-out lines PL_A1 to PL_A6 and PL_B1 to PL_B6 and the signal supply lines SPL1 to SPL6. The demux units DMU1 to DMU6 may be electrically connected to the signal selection lines CL_A and CL_B. In an example of the invention, the signal selection lines CL_A and CL_B may include a first signal selection line CL_A and a second signal selection line CL_B. However, the number of signal selection lines CL_A and CL_B is not particularly limited. In an embodiment, for example, in the case where the data lines DL1 to DL12 operate during three periods in a time division manner, the display panel DP may include three signal selection lines.

The fan-out lines PL_A1 to PL_A6 and PL_B1 to PL_B6 may be arranged in the second region A2 of the display panel DP. The selection circuit SC and the data lines DL1 to DL12 may be electrically connected through the fan-out lines PL_A1 to PL_A6 and PL_B1 to PL_B6. The fan-out lines PL_A1 to PL_A6 and PL_B1 to PL_B6 may be connected to the data lines DL1 to DL12 in the first region A1, and may be connected to the selection circuit SC in the third region A3.

The fan-out lines PL_A1 to PL_A6 and PL_B1 to PL_B6 may include first fan-out lines PL_A1, PL_A2, PL_A3, PL_A4, PL_A5, and PL_A6 connected to the data lines DL1, DL3, DL5, DL7, DL9, and DL11 of the first group and second fan-out lines PL_B1, PL_B2, PL_B3, PL_B4, PL_B5, and PL_B6 connected to the data lines DL2, DL4, DL6, DL8, DL10, and DL12 of the second group.

The plurality of demux units DMU1 to DMU6 may each include a plurality of selection transistors TS1 and TS2. In an example of the invention, the plurality of demux units DMU1 to DMU6 (hereinafter referred to as first to sixth demux units) may each include first and second selection transistors TS1 and TS2. However, the number of selection transistors included in each of the demux units DMU1 to DMU6 is not particularly limited. In an embodiment, for example, in the case where the data lines DL1 to DL12 operate during three periods in the time division manner, each of the demux units DMU1 to DMU6 may include three selection transistors.

Two fan-out lines (e.g., a 1-1st fan-out line PL_A1 and a 1-2nd fan-out line PL_A2 among the first fan-out lines PL_A1 to PL_A6) arranged adjacent to each other may be connected to different demux units (e.g., first and second demux units DMU1 and DMU2). The first demux unit DMU1 is connected to the 1-1st fan-out line PL_A1 among the first fan-out lines PL_A1 to PL_A6 and a 2-1st fan-out line PL_B1 among the second fan-out lines PL_B1 to PL_B6. The second demux unit DMU2 is connected to the 1-2nd fan-out line PL_A2 among the first fan-out lines PL_A1 to PL_A6 and a 2-2nd fan-out line PL_B2 among the second fan-out lines PL_B1 to PL_B6.

The 1-1st fan-out line PL_A1 and the 1-2nd fan-out line PL_A2 are arranged adjacent to each other in the first direction DR1, and the 2-1st fan-out line PL_B1 and the 2-2nd fan-out line PL_B2 are arranged adjacent to each other in the first direction DR1. That is, the 1-1st fan-out line PL_A1 is closer to the 1-2nd fan-out line PL_A2 than to the 2-1st fan-out line PL_B1, and the 2-1st fan-out line PL_B1 is closer to the 2-2nd fan-out line PL_B2 than to the 1-1st fan-out line PL_A1. That is, in the first direction DR1, the 1-1st fan-out line PL_A1, the 1-2nd fan-out line PL_A2, the 2-1st fan-out line PL_B1, and the 2-2nd fan-out line PL_B2 are arranged in this order.

The 1-1st fan-out line PL_A1 and the 1-2nd fan-out line PL_A2 are connected to the first and second demux units DMU1 and DMU2, respectively, and the 2-1st fan-out line PL_B1 and the 2-2nd fan-out line PL_B2 are connected to the first and second demux units DMU1 and DMU2, respectively.

In an example of the invention, the 1-1st fan-out line PL_A1 and the 1-2nd fan-out line PL_A2 may be spaced apart by a first distance d1 in the second region A2 in the first direction DR1 (i.e., direction of the bending axis BX), and the 2-1st fan-out line PL_B1 and the 2-2nd fan-out line PL_B2 may be spaced apart by a second distance d2 in the second region A2 in the first direction DR1 (i.e., direction of the bending axis BX). The first and second distances d1 and d2 may be the same, but are not limited thereto. The 1-2nd fan-out line PL_A2 and the 2-1st fan-out line PL_B1 are spaced apart by a third distance d3 in the second region A2 in the first direction DR1 (i.e., direction of the bending axis BX). The third distance d3 may be larger than each of the first and second distances d1 and d2.

In the first region A1, the data lines DL1 to DL12 may be arranged in an order different from the order in which the fan-out lines PL_A1 to PL_A6 and PL_B1 to PL_B6 are arranged in the second region A2. Therefore, two adjacent data lines (e.g., first and second data lines DL1 and DL2) may be connected to the same demux unit. The 1-2nd fan-out line PL_A2 and the 2-1st fan-out line PL_B1 may intersect each other not only in the third region A3 but also in the first region A1.

Referring to FIGS. 5A and 6, the first selection transistor TS1 may include a first electrode connected to a corresponding signal supply line (e.g., a first signal supply line SPL1) among the signal supply lines SPL1 to SPL6, a second electrode connected to a corresponding fan-out line (e.g., the 1-1st fan-out line PL_A1) among the first fan-out lines PL_A1 to PL_A6, and a third electrode connected to the first signal selection line CL_A that receives a first selection signal CLS_A. The second selection transistor TS2 may include a first electrode connected to the corresponding signal supply line (e.g., the first signal supply line SPL1) among the signal supply lines SPL1 to SPL6, a second electrode connected to a corresponding fan-out line (e.g., the 2-1st fan-out line PL_B1) among the second fan-out lines PL_B1 to PL_B6, and a third electrode connected to the second signal selection line CL_B that receives a second selection signal CLS_B. The first and second selection signals CLS_A and CLS_B received by the first and second signal selection lines CL_A and CL_B, respectively, may be alternately activated.

In an embodiment, the first and second selection transistors TS1 and TS2 may each be configured with a P-type transistor. However, an embodiment of the invention is not limited thereto, and the first and second selection transistors TS1 and TS2 may each be configured with an N-type transistor in another embodiment. The first and second selection signals CLS_A and CLS_B may be at a low level in activation periods AP1 and AP2, respectively, when the first and second selection transistors TS1 and TS2 are configured with a P-type transistor, and may be at a high level in the activation periods AP1 and AP2, respectively, when the first and second selection transistors TS1 and TS2 are configured with an N-type transistor. The activation period (i.e., a first activation period AP1 or a first period) of the first selection signal CLS_A may not overlap in time the activation period (i.e., a second activation period AP2 or a second period) of the second selection signal CLS_B. Therefore, the first and second selection transistors TS1 and TS2 may be alternately turned on.

When the first selection transistor TS1 is turned on in response to the first selection signal CLS_A in the first activation period AP1, the first signal supply line SPL1 is electrically connected to the 1-1st fan-out line PL_A1. On the contrary, since the second selection transistor TS2 is turned off in response to the second selection signal CLS_B in the first activation period AP1, the first signal supply line SPL1 is insulated from the 2-1st fan-out line PL_B1 and the 2-1st fan-out line PL_B1 may be in a floated state. Therefore, in the first activation period AP1, the 1-1st fan-out line PL_A1 may receive a data signal from the first signal supply line SPL1, whereas the 2-1st fan-out line PL_B1 may maintain a previously received data signal.

When the second selection transistor TS2 is turned on in response to the second selection signal CLS_B in the second activation period AP2, the first signal supply line SPL1 is electrically connected to the 2-1st fan-out line PL_B1. On the contrary, since the first selection transistor TS1 is turned off in response to the first selection signal CLS_A in the second activation period AP2, the first signal supply line SPL1 is insulated from the 1-1st fan-out line PL_A1 and the 1-1st fan-out line PL_A1 may be in a floated state. Therefore, in the second activation period AP2, the 2-1st fan-out line PL_B1 may receive a data signal from the first signal supply line SPL1, whereas the 1-1st fan-out line PL_A1 may maintain a previously received data signal.

The 1-2nd fan-out line PL_A2 is selected together with the 1-1st fan-out line PL_A1 to receive a data signal in the first activation period AP1, and the 2-2nd fan-out line PL_B2 is selected together with the 2-1st fan-out line PL_B1 to receive a data signal in the second activation period AP2. In the first activation period AP1, the 1-1st fan-out line PL_A1 and the 1-2nd fan-out line PL_A2 both may be in a data application state. Therefore, although these lines are arranged close to each other at the first distance d1 from each other and a data signal is temporarily distorted due to an influence of coupling, the data signal may quickly recover a level thereof. Likewise, in the second activation period AP2, the 2-1st fan-out line PL_B1 and the 2-2nd fan-out line PL_B2 both may be in the data application state. Therefore, although these lines are arranged close to each other at the second distance d2 from each other and a data signal is temporarily distorted due to an influence of coupling, the data signal may quickly recover a level thereof.

However, since the 1-2nd fan-out line PL_A2 is in the data application state and the 2-1st fan-out line PL_B1 is in the floated state in the first activation period AP1, the data signal of the 2-1st fan-out line PL_B1 may be affected by coupling at an activation time t1 of the 1-2nd fan-out line PL_A2. However, since these lines are spaced far away from each other at the third distance d3 from each other, distortion of the data signal of the 2-1st fan-out line PL_B1 may be prevented or reduced.

Furthermore, since the 2-1st fan-out line PL_B1 is in the data application state and the 1-2nd fan-out line PL_A2 is in the floated state in the second activation period AP2, the data signal of the 1-2nd fan-out line PL_A2 may be affected by coupling at an activation time t2 of the 2-1st fan-out line PL_B1. However, since these lines are spaced far away from each other at the third distance d3 from each other, distortion of the data signal of the 1-2nd fan-out line PL_A2 may be prevented or reduced Data signals applied to the 1-1st fan-out line PL_A1, the 1-2nd fan-out line PL_A2, the 2-1st fan-out line PL_B1, and the 2-2nd fan-out line PL_B2 are supplied to the first to fourth data lines DL1 to DL4, respectively. In an example of the invention, the first scan signal SS1 applied to the first scan line SL1 may be deactivated in the first active period AP1 and may be activated in the second active period AP2. An activation period SPP of the first scan signal SS1 may be referred to as a data programming period. The data signals applied to the first to fourth data lines DL1 to DL4 may be applied to a pixel that receives the first scan signal SS1.

In an example of the invention, the 1-2nd fan-out line PL_A2 and the 2-1st fan-out line PL_B1 may be arranged on different layers. Therefore, although the 1-2nd fan-out line PL_A2 and the 2-1st fan-out line PL_B1 intersect each other in the first region A1 and the third region A3, these lines may be electrically insulated from each other. As illustrated in FIG. 5B, in the case where the 1-2nd fan-outline PL_A2 is arranged on the first insulating layer 10, the 2-1st fan-out line PL_B1 may be arranged on the fourth insulating layer 40. In an embodiment, for example, the 1-2nd fan-out line PL_A2 may be arranged on the same layer as the gate electrode GT1 of the second control transistor T6 illustrated in FIG. 4 and may be formed through the same process. The 2-1st fan-out line PL_B1 may be arranged on the same layer as the gate electrode GT2 of the compensation transistor T3 illustrated in FIG. 4 and may be formed through the same process.

The 1-1st fan-out line PL_A1 and the 1-2nd fan-out line PL_A2 may be arranged on the same layer or different layers. Although FIG. 5B illustrates that the 1-1st fan-out line PL_A1 is arranged on the fourth insulating layer 40, and the 1-1st fan-out line PL_A1 may be arranged on the first insulating layer 10. In the case where the 1-1st fan-out line PL_A1 and the 1-2nd fan-out line PL_A2 are arranged on different layers, even though a distance between the 1-1st fan-out line PL_A1 and the 1-2nd fan-out line PL_A2 in the first direction DR1 (i.e., direction of the bending axis BX) reduces, a problem in which the 1-1st fan-out line PL_A1 and the 1-2nd fan-out line PL_A2 are shorted to each other in a process may not occur. Therefore, a larger number of first fan-out lines PL_A1 to PL_A6 may be arranged within a limited region in the plan view, or a width of a region in which the first fan-out lines PL_A1 to PL_A6 are arranged may be prevented from increasing.

The 2-1st fan-out line PL_B1 and the 2-2nd fan-out line PL_B2 may be arranged on the same layer or different layers. In the case where the 2-1st fan-out line PL_B1 and the 2-2nd fan-out line PL_B2 are arranged on the different layers, even though a distance between the 2-1st fan-out line PL_B1 and the 2-2nd fan-out line PL_B2 reduces, a problem in which the 2-1st fan-out line PL_B1 and the 2-2nd fan-out line PL_B2 are shorted to each other in a process may not occur Therefore, a larger number of second fan-out lines PL_B1 to PL_B6 may be arranged within a limited region, or a width of a region in which the second fan-out lines PL_B1 to PL_B6 are arranged may be prevented from increasing.

In the present embodiment, the selection circuit SC may be arranged in the third region A3, and the fan-out lines PL_A1 to PL_A6 and PL_B1 to PL_B6 may be arranged in the second region A2. In the second region A2, two fan-out lines that operate simultaneously are spaced apart by the first or second distance d1 or d2 in the first direction DR1 (i.e., direction of the bending axis BX), and two fan-out lines that operate in different periods are spaced apart by the third distance d3 in the first direction DR1 (i.e., direction of the bending axis BX) that is larger than each of the first and second distances d1 and d2. Therefore, a coupling phenomenon that may occur between the fan-out lines PL_A1 to PL_A6 and PL_B1 to PL_B6 may be prevented or reduced, thereby effectively reducing deterioration of image quality due to a signal distortion.

Figure 7A:
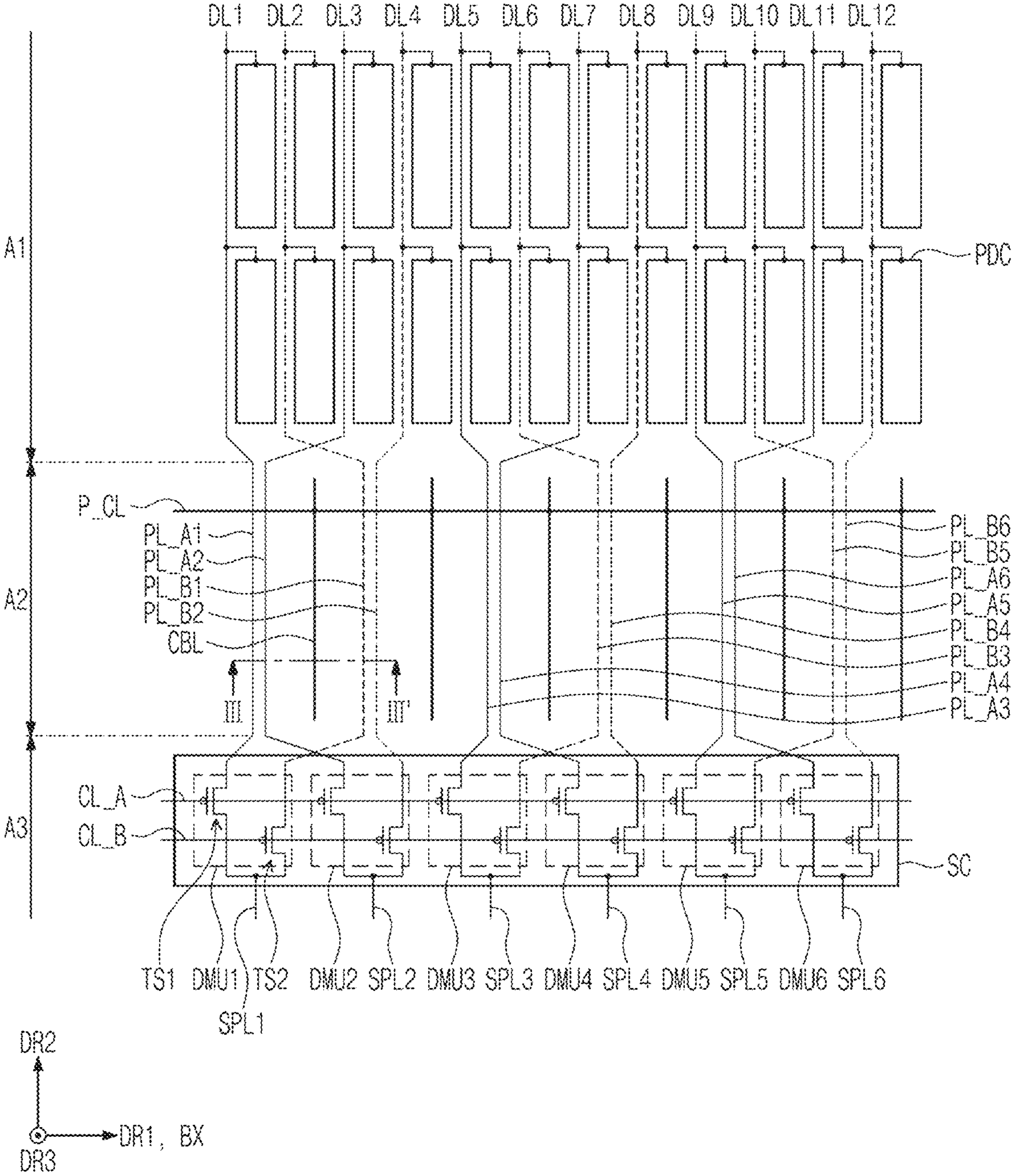
FIG. 7A is an enlarged plan view of a partial region of a display panel according to another embodiment of the invention.
Figure 7B:
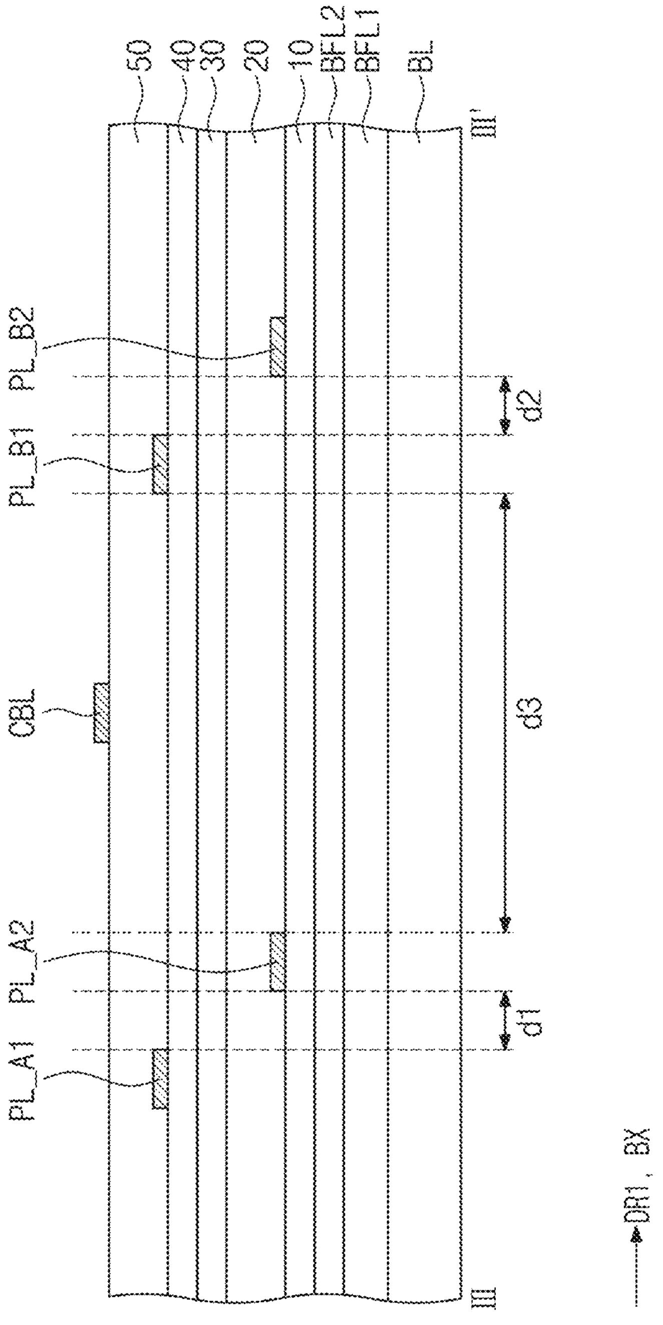
FIG. 7B is a cross-sectional view of the display panel taken along line of FIG. 7A.

FIG. 7A is an enlarged plan view of a partial region of a display panel according to an embodiment of the invention, and FIG. 7B is a cross-sectional view of the display panel taken along line illustrated in FIG. 7A. The same components as those illustrated in FIGS. 5A and 5B among components illustrated in FIGS. 7A and 7B are referred to by the same reference signs, and detailed descriptions thereof are not provided.

Referring to FIGS. 7A and 7B, the display panel DP (see FIG. 2) may further include a plurality of coupling blocking lines CBL arranged between the fan-out lines PL_A1 to PL_A6 and PL_B1 to PL_B6 in the second region A2.

In an example of the invention, each of the plurality of coupling blocking lines CBL may be arranged between the first fan-out lines PL_A1 to PL_A6 and the second fan-out lines PL_B1 to PL_B6. In an embodiment, for example, one coupling blocking line CBL among the plurality of coupling blocking lines CBL may be arranged between the 1-2nd fan-out line PL_A2 and the 2-1st fan-out line PL_B1, and another coupling blocking line CBL among the plurality of coupling blocking lines CBL may be arranged between the 1-3rd fan-out line PL_A3 and the 2-2nd fan-out line PL_B2.

A direct current ("DC") voltage may be applied to each of the plurality of coupling blocking lines CBL. In an example of the invention, the plurality of coupling blocking lines CBL may be electrically connected to each other through a voltage connection line P_CL, and the voltage connection line P_CL may receive one of DC voltages supplied to the pixels PX (see FIG. 2). The voltage connection line P_CL may be electrically connected to one of the first and second power lines PL1 and PL2 and the first and second initialization voltage lines VL1 and VL2, and may receive one of the first and second driving voltages ELVDD and ELVSS and the first and second initialization voltages Vint and Aint. In an embodiment, for example, when the voltage connection line P_CL is connected to the first power line PL1, the plurality of coupling blocking lines CBL may receive the first driving voltage ELVDD as the DC voltage through the voltage connection line P_CL.

The coupling blocking lines CBL may be arranged on a layer different from a layer on which at least one the first and second fan-out lines PL_A1 to PL_A6 and PL_B1 to PL_B6 is disposed. In an example of the invention, the coupling blocking lines CBL may be arranged on the fifth insulating layer 50. In this case, the coupling blocking lines CBL may be arranged on the same layer as the first connection electrode CNE1 illustrated in FIG. 4. However, a position of the coupling blocking lines CBL is not limited thereto. The coupling blocking lines CBL may be arranged on the fifth insulating layer 50 and patterned through the same process as the first connection electrode CNE1. Alternatively, the coupling blocking lines CBL may be arranged on the same layer as at least one of the first and second fan-out lines PL_A1 to PL_A6 and PL_B1 to PL_B6.

As described above, since each of the plurality of coupling blocking lines CBL is arranged between the first fan-out lines PL_A1 to PL_A6 and the second fan-out lines PL_B1 and PL_B6, deterioration of image quality due to a data signal distortion caused by a coupling phenomenon between the first fan-out lines PL_A1 to PL_A6 and the second fan-out lines PL_B1 and PL_B6 may be prevented or reduced.

Figure 8A:
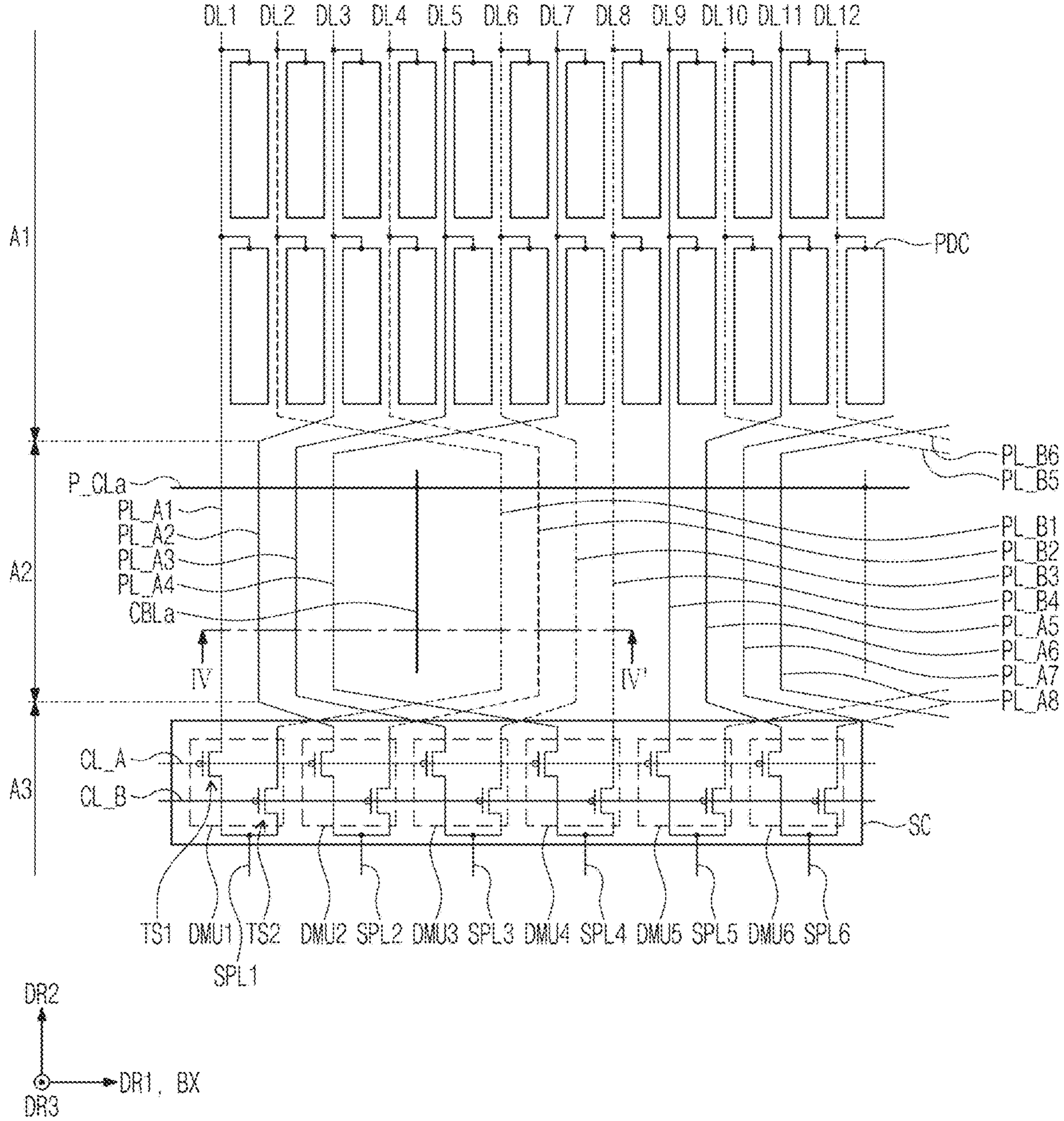
FIG. 8A is an enlarged plan view of a partial region of a display panel according to still another embodiment of the invention.
Figure 8B:
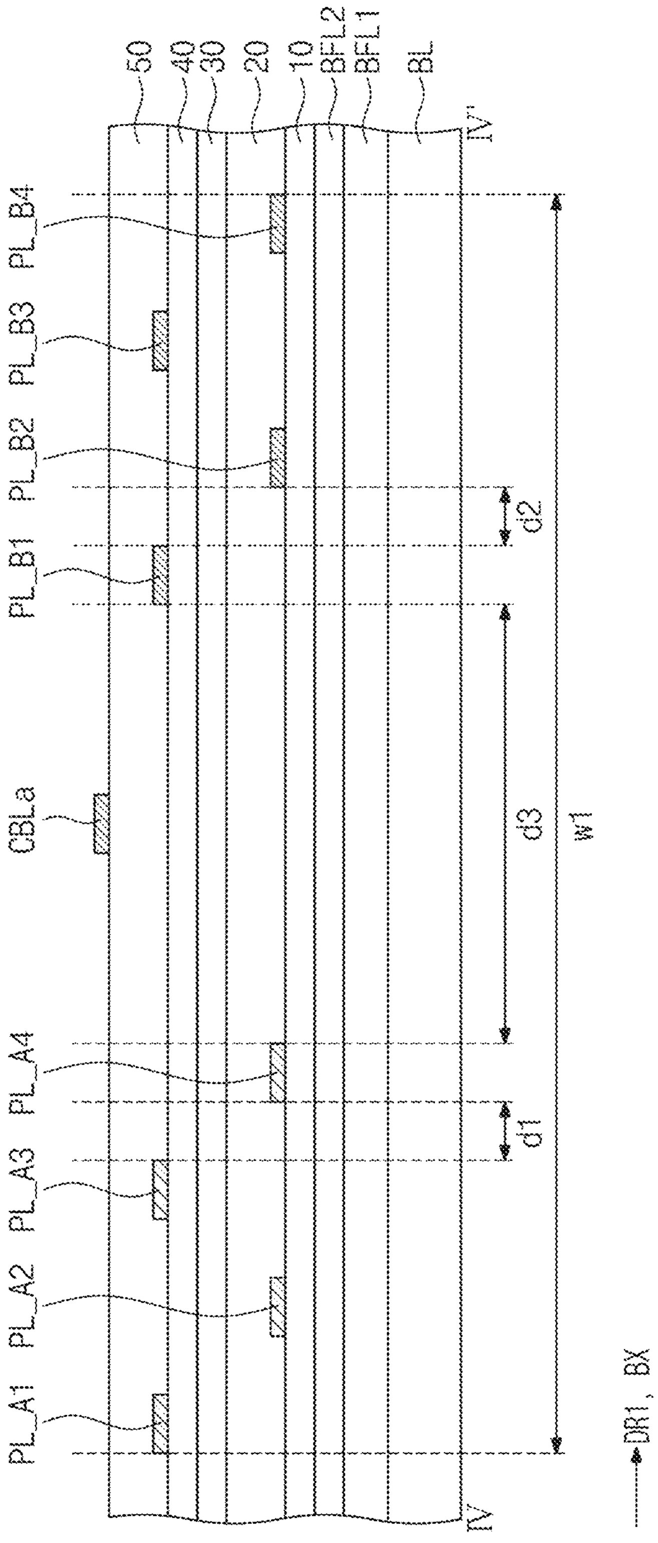
FIG. 8B is a cross-sectional view of the display panel taken along line IV-IV' of FIG. 8A.
Figure 8C:
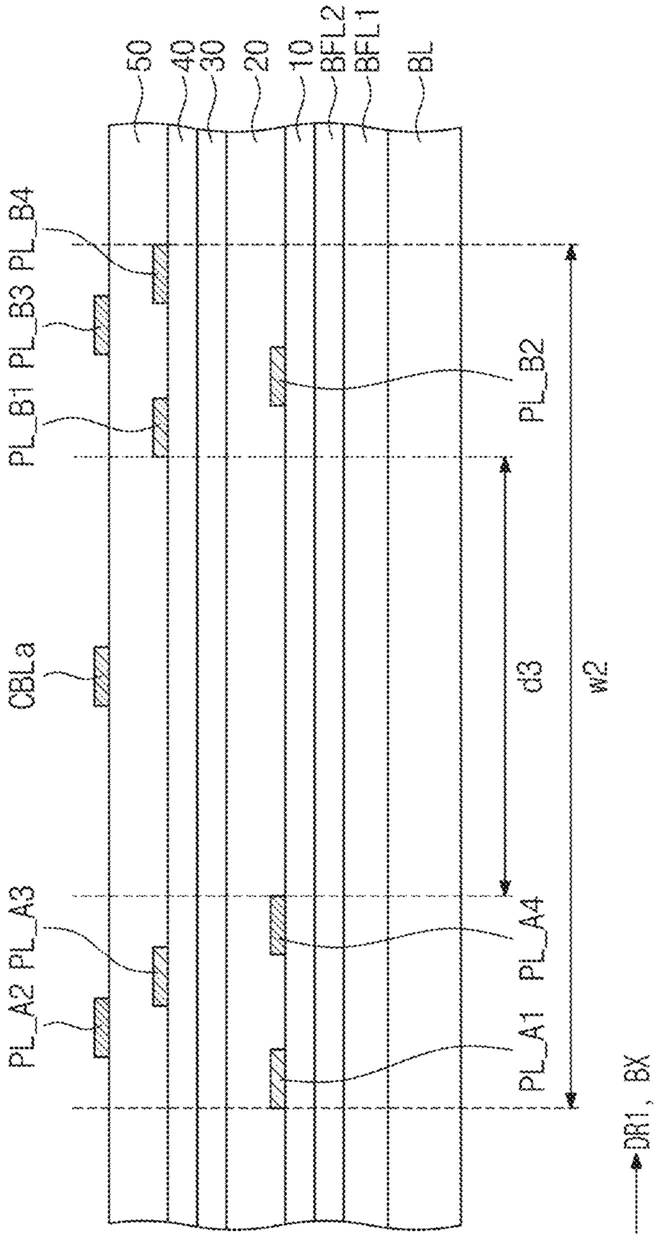
FIG. 8C is a cross-sectional view of a partial region of a display panel according to an embodiment of the invention.

FIG. 8A is an enlarged plan view of a partial region of a display panel according to an embodiment of the invention. FIG. 8B is a cross-sectional view of the display panel taken along line IV-IV' of FIG. 8A. FIG. 8C is a cross-sectional view of a partial region of a display panel according to an embodiment of the invention.

Referring to FIGS. 8A and 8B, the plurality of demux units DMU1 to DMU6 may each include a plurality of selection transistors TS1 and TS2. In an example of the invention, the plurality of demux units DMU1 to DMU6 (hereinafter referred to as first to sixth demux units) may each include first and second selection transistors TS1 and TS2.

The first demux unit DMU1 is connected to the 1-1st fan-out line PL_A1 among the first fan-out lines PL_A1 to PL_A6 and the 2-1st fan-out line PL_B1 among the second fan-out lines PL_B1 to PL_B6. The second demux unit DMU2 is connected to the 1-2nd fan-out line PL_A2 among the first fan-out lines PL_A1 to PL_A6 and the 2-2nd fan-out line PL_B2 among the second fan-out lines PL_B1 to PL_B6. The third demux unit DMU3 is connected to the 1-3rd fan-out line PL_A3 among the first fan-out lines PL_A1 to PL_A6 and the 2-3rd fan-out line PL_B3 among the second fan-out lines PL_B1 to PL_B6. The fourth demux unit DMU4 is connected to the 1-4th fan-out line PL_A4 among the first fan-out lines PL_A1 to PL_A6 and the 2-4th fan-out line PL_B4 among the second fan-out lines PL_B1 to PL_B6.

The 1-1st to 1-4th fan-out lines PL_A1 to PL_A4 are arranged adjacent to each other in the first direction DR1, and the 2-1st to 2-4th fan-out lines PL_B1 to PL_B4 are arranged adjacent to each other in the first direction DR1. In detail, in the first direction DR1, the 1-1st fan-out line PL_A1, the 1-2nd fan-out line PL_A2, the 1-3rd fan-out line PL_A3, the 1-4th fan-out line PL_A4, the 2-1st fan-out line PL_B1, the 2-2nd fan-out line PL_B2, the 2-3rd fan-out line PL_B3, and the 2-4th fan-out line PL_B4 are arranged in this order.

In an example of the invention, the 1-1st to 1-4th fan-out lines PL_A1 to PL_A4 may be spaced apart from each other by a first distance d1 in the second region A2 in the first direction DR1 (i.e., direction of the bending axis BX), and the 2-1st to 2-4th fan-out lines PL_B1 to PL_B4 may be spaced apart from each other by a second distance d2 in the second region A2 in the first direction DR1 (i.e., direction of the bending axis BX). The first and second distances d1 and d2 may be the same, but are not limited thereto. The 1-4th fan-out line PL_A4 and the 2-1st fan-out line PL_B1 are spaced apart by a third distance d3 in the second region A2 in the first direction DR1 (i.e., direction of the bending axis BX). The third distance d3 may be larger than each of the first and second distances d1 and d2.

The 1-2nd fan-out line PL_A2 may intersect the 2-1st fan-out line PL_B1 in the first region A1 and the third region A3, and the 1-3rd fan-out line PL_A3 may intersect the 2-1st fan-out line PL_B1 and the 2-2nd fan-out line PL_B2 in the first region A1 and the third region A3. The 1-4th fan-out line PL_A4 may intersect the 2-1 fan-out line PL_B1, the 2-2nd fan-out line PL_B2, and the 2-3rd fan-out line PL_B3 in the first and third regions A1 and A3.

The display panel DP (see FIG. 2) may further include a plurality of coupling blocking lines CBLa arranged between the fan-out lines PL_A1 to PL_A6 and PL_B1 to PL_B6 in the second region A2.

In an example of the invention, each of the plurality of coupling blocking lines CBLa may be arranged between the first fan-out lines PL_A1 to PL_A6 and the second fan-out lines PL_B1 to PL_B6. In an embodiment, for example, one coupling blocking line CBLa among the plurality of coupling blocking lines CBLa may be arranged between the 1-4th fan-out line PL_A4 and the 2-1st fan-out line PL_B1, and another coupling blocking line CBLa among the plurality of coupling blocking lines CBLa may be arranged between the 1-8th fan-out line PL_A8 and the 2-5th fan-out line PL_B5.

A DC voltage may be applied to each of the plurality of coupling blocking lines CBLa. In an example of the invention, the plurality of coupling blocking lines CBLa may be electrically connected to each other through a voltage connection line P_CLa, and the voltage connection line P_CLa may receive one of DC voltages supplied to the pixels PX (see FIG. 2). The voltage connection line P_CLa may be electrically connected to one of the first and second power lines PL1 and PL2 and the first and second initialization voltage lines VL1 and VL2, and may receive one of the first and second driving voltages ELVDD and ELVSS and the first and second initialization voltages Vint and Aint.

The coupling blocking lines CBLa may be arranged on a layer different from a layer on which at least one the first and second fan-out lines PL_A1 to PL_A6 and PL_B1 to PL_B6 is arranged. In an example of the invention, the coupling blocking lines CBLa may be arranged on the fifth insulating layer 50.

In FIG. 8B, the 1-1st to 1-4th fan-out lines PL_A1 to PL_A4 may be spaced apart from each other by a first distance d1 (hereinafter referred to as a spaced arrangement structure), and at least two of the 1-1st to 1-4th fan-out lines PL_A1 to PL_A4 may be arranged on the same layer. The 2-1st to 2-4th fan-out lines PL_B1 to PL_B4 may be spaced apart from each other by a second distance d2 (hereinafter referred to as a spaced arrangement structure), and at least two of the 2-1st to 2-4th fan-out lines PL_B1 to PL_B4 may be arranged on the same layer. In such a spaced arrangement structure, a width from the 1-1st fan-out line PL_A1 to the 2-4th fan-out line PL_B4 in the first direction DR1 may be defined as a first width w1.

Referring to FIG. 8C, two adjacent lines among the 1-1st to 1-4th fan-out lines PL_A1 to PL_A4 may be arranged overlapping partially each other in a plan view when the second region A2 is not bent. The 1-1st to 1-4th fan-out lines PL_A1 to PL_A4 may all be arranged on different layers, or at least two of the 1-1st to 1-4th fan-out lines PL_A1 to PL_A4 may be arranged on the same layer. Alternatively, the two adjacent lines arranged on different layers among the 1-1st to 1-4th fan-out lines PL_A1 to PL_A4 may completely overlap each other in a plan view when the second region A2 is not bent.

Two adjacent lines among the 2-1st to 2-4th fan-out lines PL_B1 to PL_B4 may be arranged overlapping partially each other in a plan view when the second region A2 is not bent. The 2-1st to 2-4th fan-out lines PL_B1 to PL_B4 may all be arranged on different layers, or at least two of the 2-1st to 2-4th fan-out lines PL_B1 to PL_B4 may be arranged on the same layer. Alternatively, the two adjacent lines arranged on different layers among the 2-1st to 2-4th fan-out lines PL_B1 to PL_B4 may completely overlap each other in a plan view when the second region A2 is not bent.

In the case where the 1-1st to 1-4th fan-out lines PL_A1 to PL_A4 overlap each other, and the 2-1st to 2-4th fan-out lines PL_B1 to PL_B4 overlap each other (hereinafter referred to as an overlapped arrangement structure), a width from the 1-1st fan-out line PL_A1 to the 2-4th fan-out line PL_B4 in the first direction DR1 may be defined as a second width w2. When the overlapped arrangement structure is adopted, the same number of fan-out lines may be arranged within a small width in comparison with the spaced arrangement structure, and, as a result, a width of a region in which fan-out lines are arranged may be reduced.

Figure 9A:
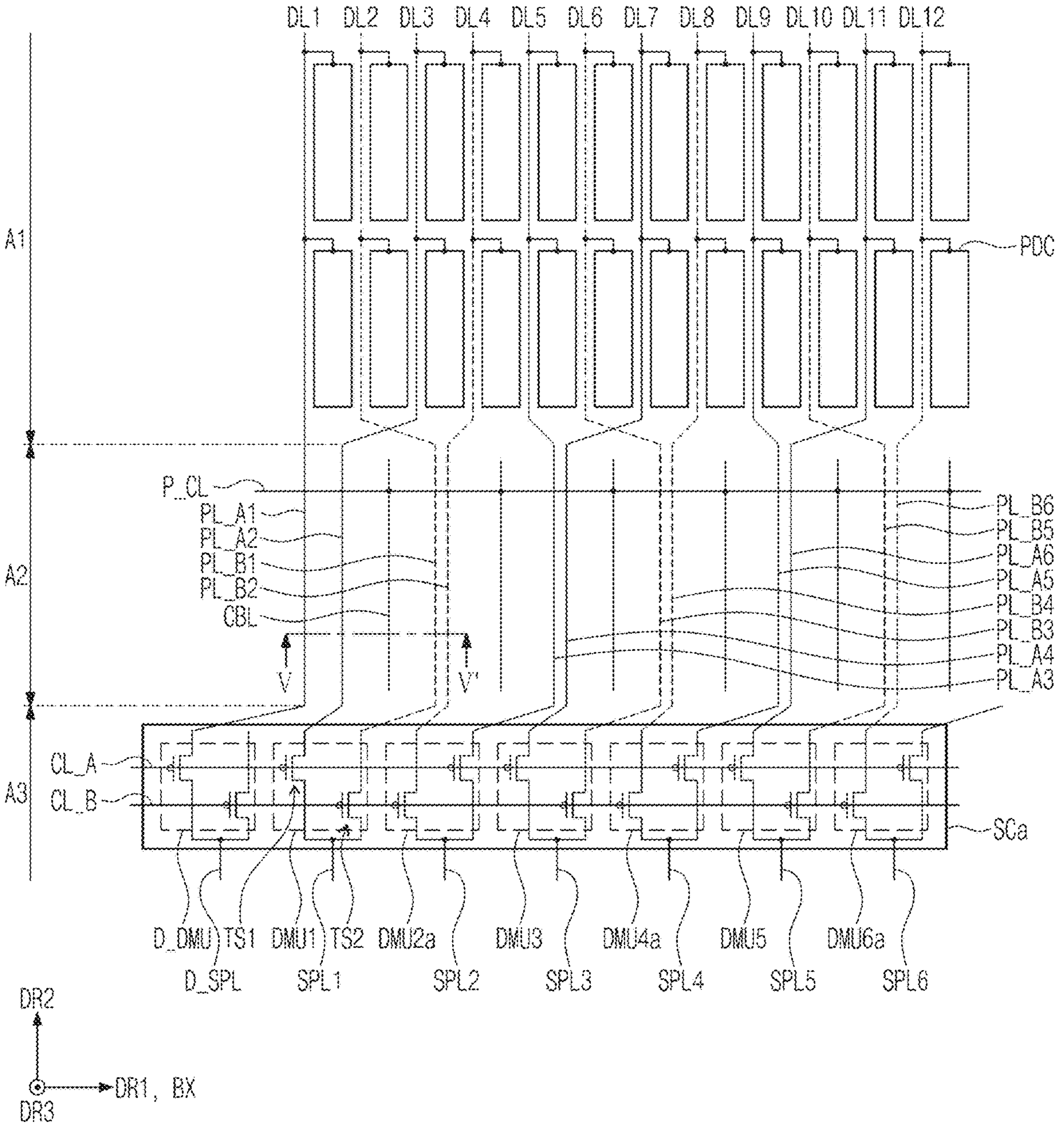
FIG. 9A is an enlarged plan view of a partial region of a display panel according to yet another embodiment of the invention.
Figure 9B:
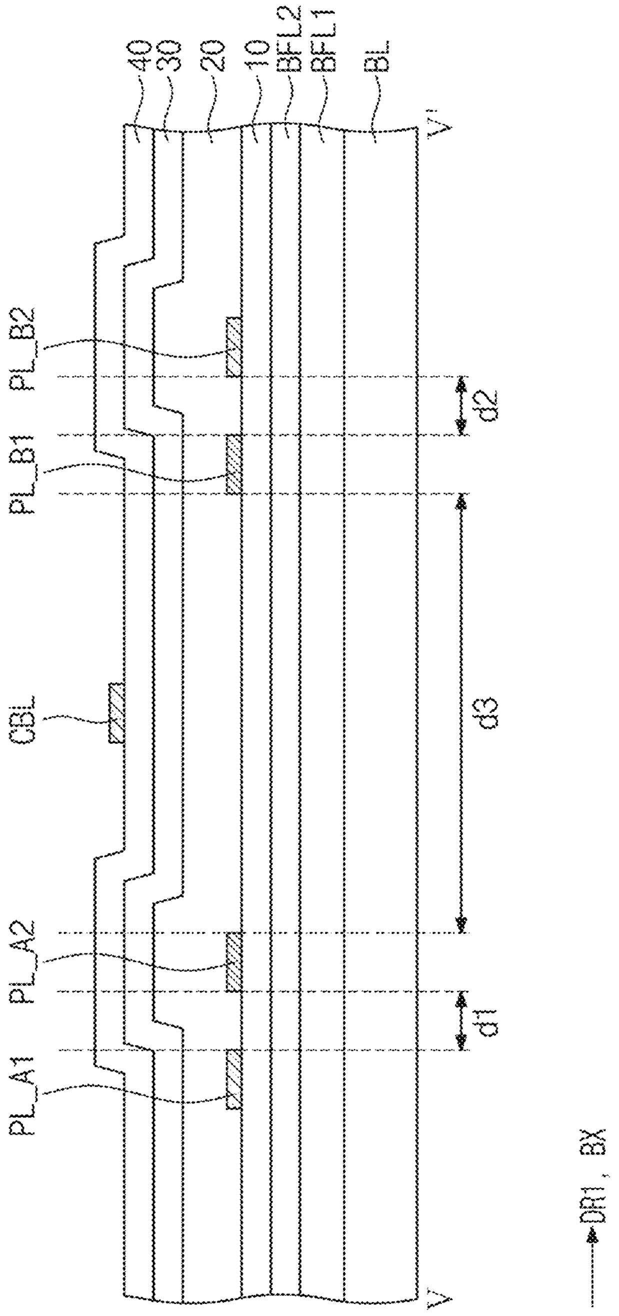
FIG. 9B is a cross-sectional view of the display panel taken along line V-V' of FIG. 9A.

FIG. 9A is an enlarged plan view of a partial region of a display panel according to an embodiment of the invention. FIG. 9B is a cross-sectional view of the display panel taken along line V-V' of FIG. 9A.

Referring to FIG. 9A, a selection circuit SCa according to an embodiment of the invention may include a plurality of demux units DMU1, DMU2*a*, DMU3, DMU4*a*, DMU5, and DMU6*a* and a dummy demux unit D_DMU. The dummy demux unit D_DMU may be connected to a dummy signal supply line D SPL, and the plurality of demux units DMU1, DMU2*a*, DMU3, DMU4*a*, DMU5, and DMU6*a* may be connected to a plurality of signal supply lines SPL1 to SPL6.

The plurality of demux units DMU1, DMU2*a*, DMU3, DMU4*a*, DMU5, and DMU6*a* may each include a plurality of selection transistors TS1 and TS2. The dummy demux unit D_DMU may also include the plurality of selection transistors TS1 and TS2. In an example of the invention, the plurality of demux units DMU1, DMU2*a*, DMU3, DMU4*a*, DMU5, and DMU6*a* (hereinafter referred to as first to sixth demux units) and the dummy demux unit D_DMU may each include first and second selection transistors TS1 and TS2. In each of the first, third, and fifth demux units DMU1, DMU3, and DMU5 (i.e., odd-numbered demux units) and the dummy dumux unit D_DMU, the first selection transistor TS1 may be arranged further on a right side than the second selection transistor TS2. In each of the second, fifth, and sixth demux units DMU2*a*, DMU4*a*, and DMU6*a* (i.e., even-numbered demux units), the second selection transistor TS2 may be arranged further on a right side than the first selection transistor TS1.

The dummy demux unit D_DMU is connected to the 1-1st fan-out line PL_A1 among the first fan-out lines PL_A1 to PL_A6. The first demux unit DMU1 is connected to the 1-2nd fan-out line PL_A2 among the first fan-out lines PL_A1 to PL_A6 and the 2-1st fan-out line PL_B1 among the second fan-out lines PL_B1 to PL_B6. The second demux unit DMU2*a* is connected to the 2-2nd fan-out line PL_B2 among the second fan-out lines PL_B1 to PL_B6 and the 1-3rd fan-out line PL_A3 among the first fan-out lines PL_A1 to PL_A6.

The 1-1st fan-out line PL_A1 and the 1-2nd fan-out line PL_A2 are arranged adjacent to each other in the first direction DR1, and the 2-1st fan-out line PL_B1 and the 2-2nd fan-out line PL_B2 are arranged adjacent to each other in the first direction DR1. That is, the 1-1st fan-out line PL_A1 is closer to the 1-2nd fan-out line PL_A2 than to the 2-1st fan-out line PL_B1, and the 2-1st fan-out line PL_B1 is closer to the 2-2nd fan-out line PL_B2 than to the 1-1st fan-out line PL_A1. That is, in the first direction DR1, the 1-1st fan-out line PL_A1, the 1-2nd fan-out line PL_A2, the 2-1st fan-out line PL_B1, the 2-2nd fan-out line PL_B2, and the 1-3rd fan-out line PL_A3 are arranged in this order.

In the case where the dummy demux unit D_DMU is further provided, and the first and second selection transistors TS1 and TS2 are arranged in different orders in the odd-numbered demux units and the even-numbered demux units, the first and second fan-out lines PL_A1 to PL_A6 and PL_B1 to PL_B6 may be arranged without intersection therebetween in the third region A3. In particular, in the third region A3, the 1-2nd fan-out line PL_A2 and the 2-1st fan-out line PL_B1 may not intersect each other, and the 1-4th fan-out line PL_A4 and the 2-3rd fan-out line PL_B3 may not intersect each other (hereinafter a non-intersecting structure).

In the case where the first and second fan-out lines PL_A1 to PL_A6 and PL_B1 to PL_B6 do not intersect in the third region A3, the first and second fan-out lines PL_A1 to PL_A6 and PL_B1 to PL_B6 may all be arranged on the same layer, as illustrated in FIG. 8B. In a structure in which a lamination thickness is reduced in order to improve bendability in the second region A2 (i.e., structure in which the number of laminated layers is reduced), it may be difficult to arrange the first and second fan-out lines PL_A1 to PL_A6 and PL_B1 to PL_B6 on different layers. In this case, the first and second fan-out lines PL_A1 to PL_A6 and PL_B1 to PL_B6 may all be arranged on the same layer by adopting the non-intersecting structure.

Figure 10A:
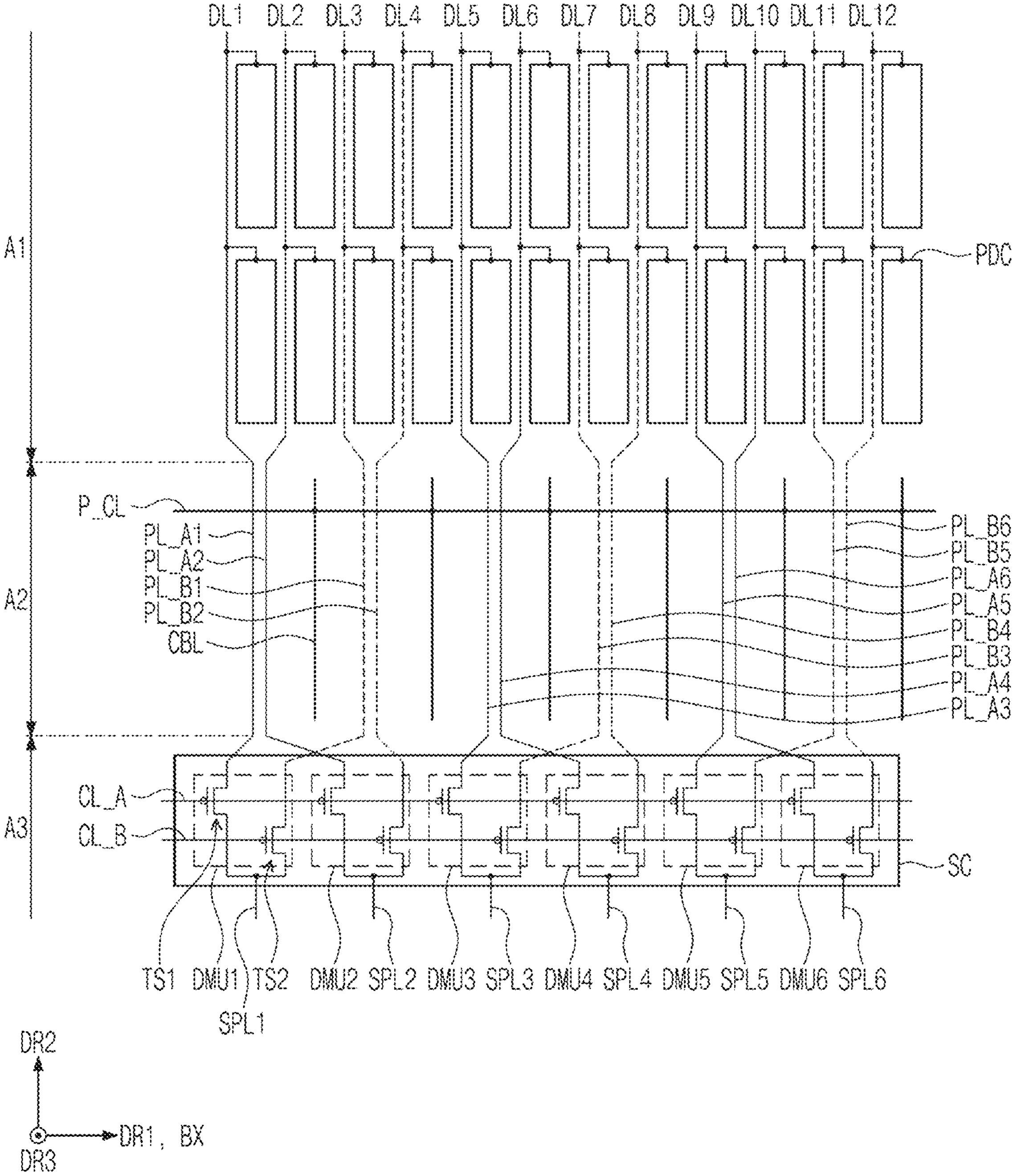
FIGS. 10A and 10B are enlarged plan views of a partial region of a display panel according to embodiments of the invention.
Figure 10B:
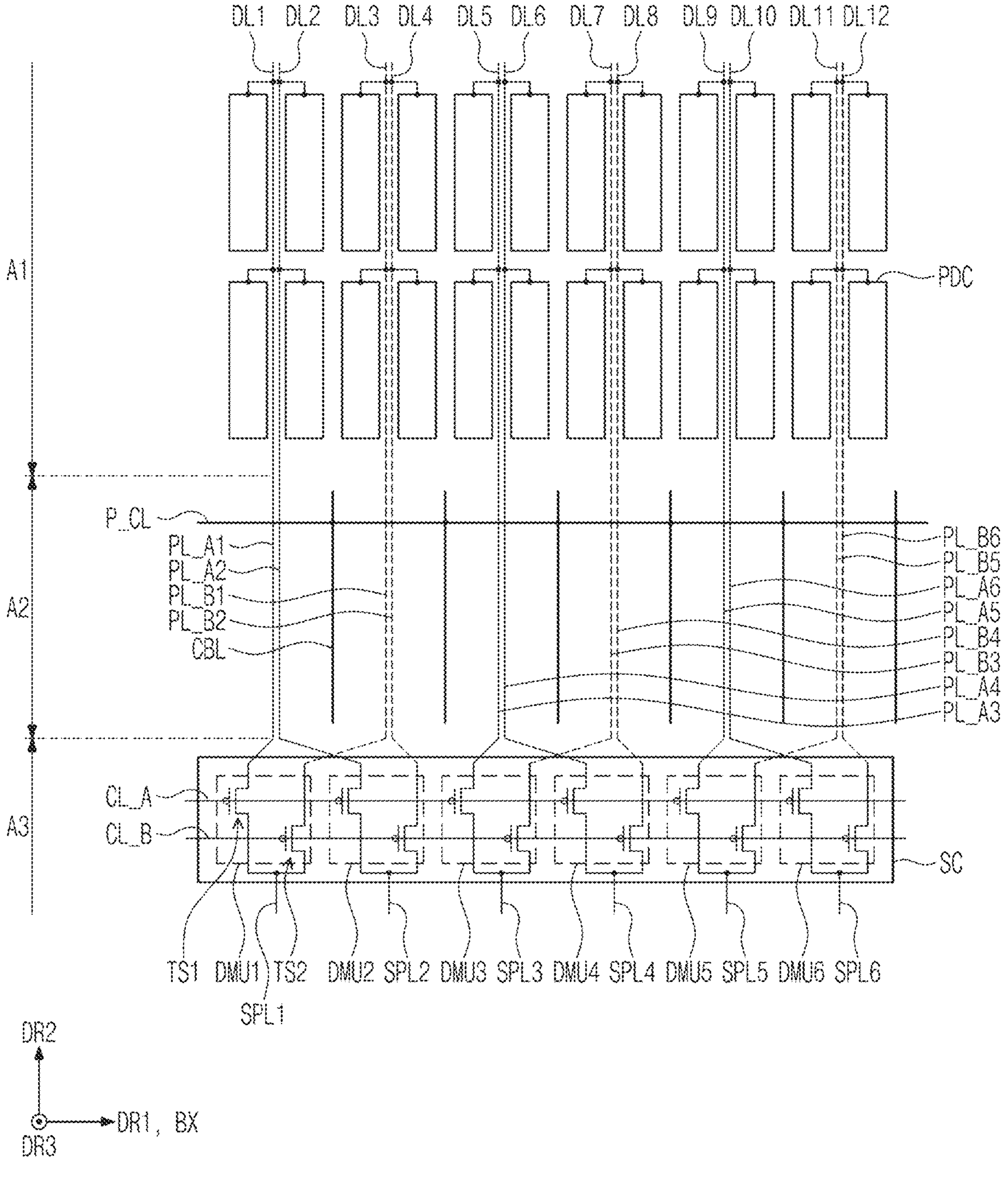

FIGS. 10A and 10B are enlarged plan views of a partial region of a display panel according to embodiments of the invention.

Referring to FIG. 10A, first to 12th data lines DL1 to DL12 are arranged in the first region A1 of the display panel DP (see FIG. 2). The first to 12th data lines DL1 to DL12 may be divided into two groups (i.e., a first group and a second group) that are driven during two periods, respectively, in a time division manner. The data lines DL1, DL2, DL5, DL6, DL9, and DL10 of the first group are driven during a first period, and the data lines DL3, DL4, DL7, DL8, DL11, and DL12 of the second group are driven during a second period that is temporally separated from the first period. The first period and the second period may alternately occur.

In an example of the invention, the data lines DL1 to DL12 may be arranged in an order that is the same as the order in which the fan-out lines PL_A1 to PL_A6 and PL_B1 to PL_B6 are arranged in the second region A2. In an example of the invention, two fan-out lines (e.g., a 1-1st fan-out line PL_A1 and a 1-2nd fan-out line PL_A2 among the first fan-out lines PL_A1 to PL_A6) arranged adjacent to each other may be connected to different demux units (e.g., first and second demux units DMU1 and DMU2). In this case, two adjacent data lines (e.g., first and second data lines DL1 and DL2 connected to the 1-1st fan-out line PL_A1 and the 1-2nd fan-out line PL_A2, respectively) may also be connected to different demux units. Therefore, although the 1-2nd fan-out line PL_A2 and the 2-1st fan-out line PL_B1 intersect each other in the third region A3, the 1-2nd fan-out line PL_A2 and the 2-1st fan-out line PL_B1 may not intersect each other in the first region A1.

In FIG. 10A, the first to 12th data lines DL1 to DL12 are arranged at regular intervals in the first direction DR1. However, an embodiment of the invention is not limited thereto.

Referring to FIG. 10B, the first to 12th data lines DL1 to DL12 may be arranged at different intervals in the first direction DR1. A distance between the first and second data lines DL1 and DL2 in the plan view may be defined as a fourth distance, and a distance between the third and fourth data lines DL3 and DL4 in the plan view may be defined as a fifth distance. Here, a pixel driving circuit PDC may be arranged between the second and third data lines DL2 and DL3, and a distance between the second and third data lines DL2 and DL3 in the plan view may be larger than each of the fourth and fifth distances.

Two data lines (e.g., first and second data lines DL1 and DL2) connected to two different demux units (e.g., first and second demux units DMU1 and DMU2), respectively, may be arranged adjacent to each other, and the pixel driving circuit PDC may not be arranged between the first and second data lines DL1 and DL2. The third and fourth data lines DL3 and DL4 connected to the first and second demux units DMU1 and DMU2, respectively, may be arranged adjacent to each other, and the pixel driving circuit PDC may not be arranged between the third and fourth data lines DL3 and DL4.

Here, the first and second data lines DL1 and DL2 are connected to the 1-1st fan-out line PL_A1 and the 1-2nd fan-out line PL_A2, respectively, and the third and fourth data lines DL3 and DL4 are connected to the 2-1st fan-out line PL_B1 and the 2-2nd fan-out line PL_B2, respectively.

The first and second data lines DL1 and DL2 are simultaneously driven during a first period and thus may be arranged adjacent to each other, and the third and fourth data lines DL3 and DL4 are simultaneously driven during a second period and thus may be arranged adjacent to each other. The second and third data lines DL2 and DL3 are driven during different periods, and one of the second and third data lines DL2 and DL is in a floated state, and thus the second and third data lines DL2 and DL may be vulnerable to a coupling phenomenon. Therefore, the distance between the second and third data lines DL2 and DL3 in the plan view is rendered larger than each of the fourth and fifth distances, thereby preventing or reducing a signal distortion due to a coupling phenomenon.

Figure 11:
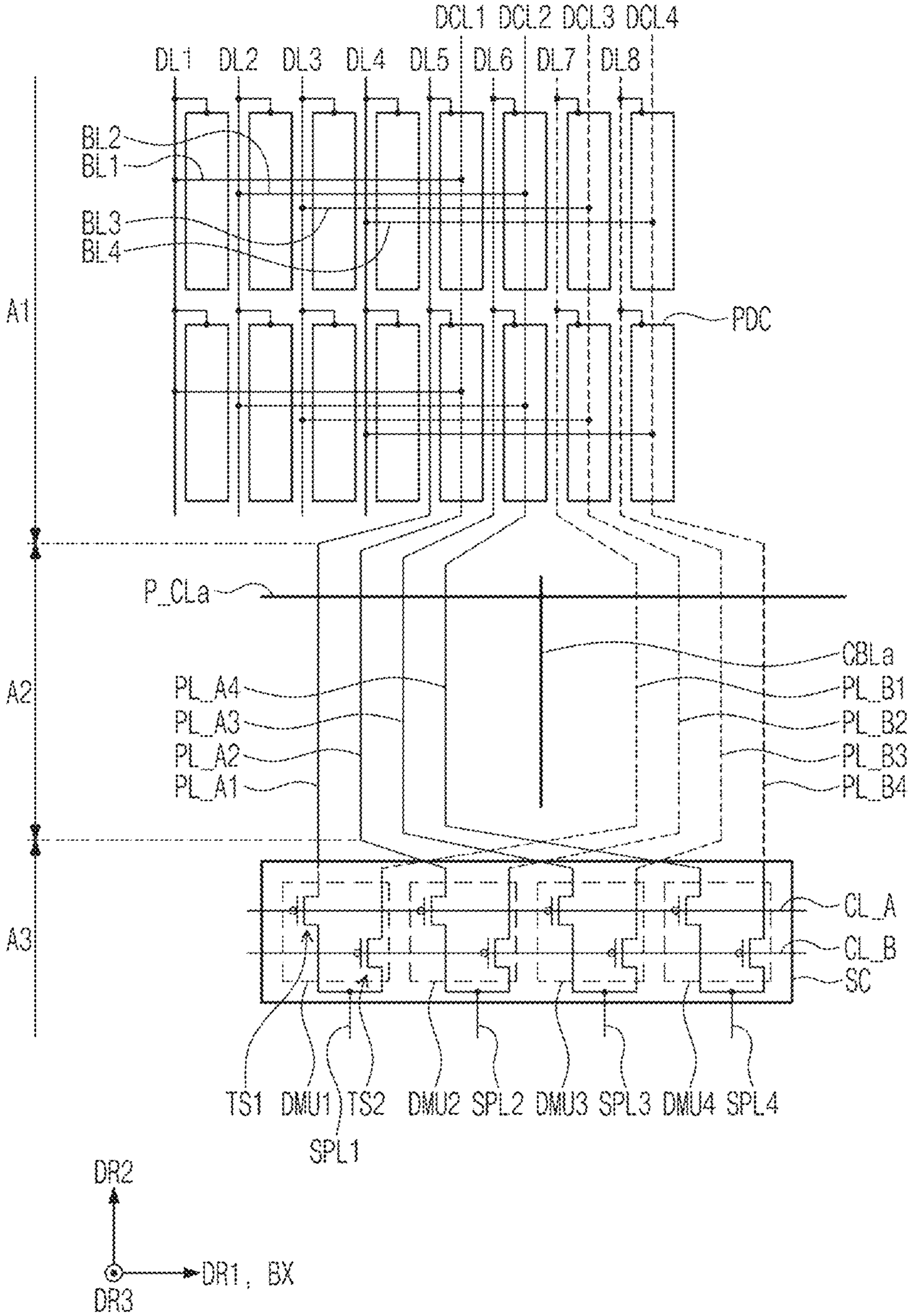
FIG. 11 is an enlarged plan view of a partial region of a display panel according to another embodiment of the invention.

FIG. 11 is an enlarged plan view of a partial region of a display panel according to an embodiment of the invention.

Referring to FIG. 11, first to eighth data lines DL1 to DL8 are arranged in the first region A1 of the display panel DP (see FIG. 2). The first to eighth data lines DL1 to DL8 may be divided into two groups (i.e., a first group and a second group) that are driven during two periods, respectively, in a time division manner. The data lines DL1, DL2, DL5, and DL6 of the first group are driven during a first period, and the data lines DL3, DL4, DL7, and DL8 of the second group are driven during a second period that is temporally separated from the first period. The first period and the second period may alternately occur.

The first to fourth data lines DL1 to DL4 among the first to eighth data lines DL1 to DL8 are electrically connected to the 1-1st and 1-2nd fan-out lines PL_A1 and PL_A2 and the 2-1st and 2-2nd fan-out lines PL_B1 and PL_B2, respectively. The fifth to eight data lines DL5 to DL8 among the first to eighth data lines DL1 to DL8 are electrically connected to the 1-3rd and 1-4th fan-out lines PL_A3 and PL_A4 and the 2-3rd and 2-4th fan-out lines PL_B3 and PL_B4, respectively. The first to fourth data lines DL1 to DL4 are electrically connected to the 1-1st and 1-2nd fan-out lines PL_A1 and PL_A2 and the 2-1st and 2-2nd fan-out lines PL_B1 and PL_B2, respectively through data connection lines (hereinafter first to fourth data connection lines DCL1 to DCL4). The fifth to eighth data lines DL5 to DL8 may be directly connected to the 1-3rd and 1-4th fan-out lines PL_A3 and PL_A4 and the 2-3rd and 2-4th fan-out lines PL_B3 and PL_B4, respectively or may be integrally formed therewith.

In an example of the invention, the display panel DP (see FIG. 2) may further include first to fourth bridge lines BL1 to BL4 for connecting the first to fourth data lines DL1 to DL4 to the first to fourth data connection lines DCL1 to DCL4.

The first to fourth data connection lines DCL1 to DCL4 may be arranged adjacent to the fifth to eighth data lines DL5 to DL8, respectively. The first data connection line DCL1 may be arranged between the fifth and sixth data lines DL5 and DL6, and the second data connection line DCL2 may be arranged between the sixth and seventh data lines DL6 and DL7. The third data connection line DCL3 is arranged between the seventh and eighth data lines DL7 and DL8, and the fourth data connection line DCL4 is arranged adjacent to the eighth data line DL8.

Here, the fifth and sixth data lines DL5 and DL6 and the first and second data connection lines DCL1 and DCL2 may be spaced apart from each other in the plan view by a sixth distance, and the seventh and eighth data lines DL7 and DL8 and the third and fourth data connection lines DCL3 and DCL4 may be spaced apart from each other in the plan view by a seventh distance. The second data connection line DCL2 and the seventh data line DL7 may be spaced apart by a distance in the plan view, which is larger than each of the sixth and seventh distances.

The fifth and sixth data lines DL5 and DL6 and the first and second data connection lines DCL1 and DCL2 are simultaneously driven during the first period and thus may be arranged adjacent to each other. Furthermore, the seventh and eighth data lines DL7 and DL8 and the third and fourth data connection lines DCL3 and DCL4 are simultaneously driven during the second period and thus may be arranged adjacent to each other. The second data connection line DCL2 and the seventh data line DL7 are driven during different periods, and one of the second data connection line DCL2 and the seventh data line DL7 is in a floated state, and thus the second data connection line DCL2 and the seventh data line DL7 may be vulnerable to a coupling phenomenon. Therefore, the distance between the second data connection line DCL2 and the seventh data line DL7 in the plan view is rendered larger than each of the sixth and seventh distances, thereby preventing or reducing a signal distortion due to a coupling phenomenon.

According to the invention, two adjacent fan-out lines that operate simultaneously among a plurality of fan-out lines are spaced apart by a first or second distance, and two adjacent fan-out lines that operate in different periods are spaced apart by a third distance larger than each of the first and second distances.

Therefore, a coupling phenomenon that may occur between fan-out lines in a bending region may be prevented or reduced, thereby effectively reducing deterioration of image quality due to a signal distortion.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display device comprising a display panel and a driving chip mounted on the display panel,
- wherein the display panel comprises:
  - a base layer including a first region, a second region adjacent to the first region and bent with respect to a bending axis, and a third region adjacent to the second region;
  - a plurality of pixels arranged in the first region;
  - a plurality of signal lines arranged in the first region and connected to the plurality of pixels;
  - a plurality of fan-out lines arranged in the second region and connected to the plurality of signal lines; and
  - a selection circuit arranged between the plurality of fan-out lines and the driving chip in the third region and connected to the plurality of fan-out lines and the driving chip,
- wherein the selection circuit is electrically connected to first fan-out lines among the plurality of fan-out lines during a first period and electrically connected to second fan-out lines among the plurality of fan-out lines during a second period,
- two adjacent first fan-out lines are spaced apart by a first distance in a direction of the bending axis in the second region, and two adjacent second fan-out lines are spaced apart by a second distance in the direction of the bending axis in the second region, and
- a third distance between a first fan-out line of the first fan-out lines and a second fan-out line of the second fan-out line, which are adjacent to each other in the direction of the bending axis in the second region, is larger than each of the first and second distances.

2. The display device of claim 1,
- wherein the selection circuit includes a plurality of demux units,
- wherein one of the first fan-out lines and one of the second fan-out lines are connected to each of the plurality of demux units.

3. The display device of claim 2, wherein the plurality of demux units include:

a first demux unit connected to a 1-1st fan-out line among the first fan-out lines and a 2-1st fan-out line among the second fan-out lines; and a second demux unit connected to a 1-2nd fan-out line among the first fan-out lines and a 2-2nd fan-out line among the second fan-out lines, wherein the 1-1st fan-out line and the 1-2nd fan-out line are spaced apart by the first distance in the direction of the bending axis in the second region, and the 2-1st fan-out line and the 2-2nd fan-out line are spaced apart by the second distance in the direction of the bending axis in the second region, and the 1-2nd fan-out line and the 2-1st fan-out line are spaced apart by the third distance in the direction of the bending axis in the second region.

4. The display device of claim 3, wherein the 1-1st fan-out line, the 1-2nd fan-out line, the 2-1st fan-out line, and the 2-2nd fan-out line are arranged in this order.

5. The display device of claim 3, wherein the 1-2nd fan-out line and the 2-1st fan-out line are arranged on different layers from each other.

6. The display device of claim 5, wherein the 1-1st fan-out line and the 1-2nd fan-out line are arranged on different layers from each other, and wherein the 2-1st fan-out line and the 2-2nd fan-out line are arranged on different layers from each other.

7. The display device of claim 3, wherein the display panel further comprises a coupling blocking line, which is arranged between the 1-2nd fan-out line and the 2-1st fan-out line and to which a DC voltage is applied.

8. The display device of claim 7, wherein the coupling blocking line is arranged on a layer different from a layer on which at least one of the 1-1st fan-out line, the 1-2nd fan-out line, the 2-1st fan-out line, and the 2-2nd fan-out line is disposed.

9. The display device of claim 2, wherein the plurality of demux units include:

a first demux unit connected to a 1-1st fan-out line among the first fan-out lines and a 2-1st fan-out line among the second fan-out lines;

a second demux unit connected to a 1-2nd fan-out line among the first fan-out lines and a 2-2nd fan-out line among the second fan-out lines;

a third demux unit connected to a 1-3rd fan-out line among the first fan-out lines and a 2-3rd fan-out line among the second fan-out lines; and a fourth demux unit connected to a 1-4th fan-out line among the first fan-out lines and a 2-4th fan-out line among the second fan-out lines, wherein two adjacent fan-out lines among the 1-1st fan-out line, the 1-2nd fan-out line, the 1-3rd fan-out line, and the 1-4th fan-out line are spaced apart from each other by the first distance in the direction of the bending axis in the second region, and two adjacent fan-out lines among the 2-1st fan-out line, the 2-2nd fan-out line, the 2-3rd fan-out line, and the 2-4th fan-out line are spaced apart from each other by the second distance in the direction of the bending axis in the second region, and the 1-4th fan-out line and the 2-1st fan-out line are spaced apart by the third distance in the direction of the bending axis in the second region.

10. The display device of claim 9, wherein the 1-1st fan-out line, the 1-2nd fan-out line, the 1-3rd fan-out line, the 1-4th fan-out line, the 2-1st fan-out line, the 2-2nd fan-out line, the 2-3rd fan-out line, and the 2-4th fan-out line are arranged in this order.

11. The display device of claim 10, wherein each of the 1-2nd fan-out line, the 1-3rd fan-out line, and the 1-4th fan-out line is arranged on a layer different from a layer on which a line intersecting therewith among the 2-1st fan-out line, the 2-2nd fan-out line, and the 2-3rd fan-out line is disposed.

12. The display device of claim 10, wherein the display panel further comprises a coupling blocking line, which is arranged between the 1-4th fan-out line and the 2-1st fan-out line and to which a DC voltage is applied.

13. The display device of claim 12, wherein the coupling blocking line is arranged on a layer different from a layer on which at least one of the 1-1st fan-out line, the 1-2nd fan-out line, the 1-3rd fan-out line, the 1-4th fan-out line, the 2-1st fan-out line, the 2-2nd fan-out line, the 2-3rd fan-out line, and the 2-4th fan-out line is disposed.

14. The display device of claim 9, wherein at least two of the 1-1st fan-out line, the 1-2nd fan-out line, the 1-3rd fan-out line, and the 1-4th fan-out line are arranged on different layers and overlap each other in a plan view when the second region is not bent, and wherein at least two of the 2-1st fan-out line, the 2-2nd fan-out line, the 2-3rd fan-out line, and the 2-4th fan-out line are arranged on different layers and overlap each other in the plan view when the second region is not bent.

15. The display device of claim 2, wherein the plurality of demux units include:

a dummy demux unit connected to a 1-1st fan-out line among the first fan-out lines;

a first demux unit connected to a 1-2nd fan-out line among the first fan-out lines and a 2-1st fan-out line among the second fan-out lines; and a second demux unit connected to a 1-3rd fan-out line among the first fan-out lines and a 2-2nd fan-out line among the second fan-out lines, wherein the 1-1st fan-out line and the 1-2nd fan-out line are spaced apart by the first distance in the direction of the bending axis in the second region, and the 2-1st fan-out line and the 2-2nd fan-out line are spaced apart by the second distance in the direction of the bending axis in the second region, and the 1-2nd fan-out line and the 2-1st fan-out line are spaced apart by the third distance in the direction of the bending axis in the second region.

16. The display device of claim 15, wherein the 1-1st fan-out line, the 1-2nd fan-out line, the 2-1st fan-out line, the 2-2nd fan-out line, and the 1-3rd fan-out line are arranged in this order.

17. The display device of claim 16, wherein the 1-1st fan-out line, the 1-2nd fan-out line, the 2-1st fan-out line, the 2-2nd fan-out line, and the 1-3rd fan-out line are arranged on a same layer.

18. The display device of claim 16, wherein the display panel further comprises a coupling blocking line, which is arranged between the 1-2nd fan-out line and the 2-1st fan-out line and between the 2-2nd fan-out line and the 1-3rd fan-out line and to which a DC voltage is applied.

19. The display device of claim 1, wherein the plurality of signal lines include:

data lines of a first group connected to the plurality of first fan-out lines, respectively; and data lines of a second group connected to the plurality of second fan-out lines, respectively, wherein the data lines of the first group and the data lines of the second group are spaced apart at regular intervals and arranged alternately.

20. A display device comprising a display panel and a driving chip mounted on the display panel, wherein the display panel comprises:

a base layer including a first region, a second region adjacent to the first region and bent with respect to a bending axis, and a third region adjacent to the second region;

a plurality of pixels arranged in the first region;

a plurality of signal lines arranged in the first region and connected to the plurality of pixels;

a plurality of fan-out lines arranged in the second region and connected to the plurality of signal lines; and a selection circuit arranged between the plurality of fan-out lines and the driving chip in the third region and connected to the plurality of fan-out lines and the driving chip, wherein the selection circuit includes a first demux unit connected to a 1-1st fan-out line and 2-1st fan-out line among the plurality of fan-out lines and a second demux unit connected to a 1-2nd fan-out line and 2-2nd fan-out line among the plurality of fan-out lines, wherein the 2-1st fan-out line and the 1-2nd fan-out line intersect each other in the third region in a plan view, wherein the 1-1st fan-out line and the 1-2nd fan-out line are spaced apart by a first distance in the direction of the bending axis in the second region, and the 2-1st fan-out line and the 2-2nd fan-out line are spaced apart by a second distance in the direction of the bending axis in the second region, and wherein the 1-2nd fan-out line and the 2-1st fan-out line are spaced apart by a third distance larger than each of the first and second distances in the direction of the bending axis in the second region.

21. The display device of claim 20, wherein the first demux unit is electrically connected to the 1-1st fan-out line and the second demux unit is electrically connected to the 1-2nd fan-out line during a first period, and wherein the first demux unit is electrically connected to the 2-1st fan-out line and the second demux unit is electrically connected to the 2-2nd fan-out line during a second period, wherein the first and second periods are alternately occurred.

22. The display device of claim 20, wherein the display panel further comprises a coupling blocking line, which is arranged between the 1-2nd fan-out line and the 2-1st fan-out line and to which a DC voltage is applied.

23. The display device of claim 22, wherein the coupling blocking line is arranged on a layer different from a layer on which at least one of the 1-1st fan-out line, the 1-2nd fan-out line, the 2-1st fan-out line, and the 2-2nd fan-out line is arranged.

24. The display device of claim 22, wherein the display panel further comprises:

a first power line configured to supply a first driving voltage to the pixels; and a second power line configured to supply a second driving voltage to the pixels, wherein the coupling blocking line is electrically connected to one of the first and second power lines and receives one of the first and second driving voltages as the DC voltage.

* * * * *